United States Patent [19]

Kirkpatrick

[11] Patent Number: 5,424,720
[45] Date of Patent: * Jun. 13, 1995

[54] MONITORING SYSTEM FOR A REFRIGERATED VEHICLE

[75] Inventor: Robert Kirkpatrick, Indianapolis, Ind.

[73] Assignee: Lee Mechanical, Inc., Indianapolis, Ind.

[*] Notice: The portion of the term of this patent subsequent to Nov. 13, 2007 has been disclaimed.

[21] Appl. No.: 839,779

[22] PCT Filed: Aug. 22, 1990

[86] PCT No.: PCT/US90/04800
§ 371 Date: Mar. 6, 1992
§ 102(e) Date: Mar. 6, 1992

[87] PCT Pub. No.: WO91/03805
PCT Pub. Date: Mar. 21, 1991

Related U.S. Application Data

[63] Continuation-in-part of Ser. No. 404,786, Sep. 8, 1989, Pat. No. 4,970,496.

[51] Int. Cl.$^6$ .............................................. G08B 17/00
[52] U.S. Cl. ..................... 340/585; 346/33 TP; 374/186
[58] Field of Search ............... 340/585–586, 340/596, 539, 618, 519–520, 435, 449, 451, 431, 870.17; 364/557; 374/141, 186; 62/125–130; 123/198 DB; 343/713; 455/345, 99; 346/33 TP

[56] References Cited

U.S. PATENT DOCUMENTS

| | | | |
|---|---|---|---|
| 2,848,895 | 8/1958 | Bristol | 374/186 |
| 3,049,923 | 8/1962 | Mitchell | 374/186 X |
| 3,119,269 | 1/1964 | Hiscock | 346/33 TP |
| 3,221,321 | 11/1965 | Hashimoto | 374/186 X |
| 3,802,212 | 4/1974 | Martin et al. | 62/407 X |
| 3,868,697 | 2/1975 | Schefe | 346/33 TP X |
| 4,007,637 | 2/1977 | Nakagawa et al. | 374/186 |
| 4,024,495 | 5/1977 | O'Brien | 340/57 |
| 4,074,275 | 2/1978 | Stires, III | 346/33 TP X |
| 4,124,013 | 11/1978 | Rivalto | 123/198 DB |
| 4,135,400 | 1/1979 | Maxwell et al. | 346/33 TP X |
| 4,182,134 | 1/1980 | Viegas et al. | 62/298 |
| 4,385,289 | 5/1983 | McMillan | 340/585 |
| 4,419,866 | 12/1983 | Howland | 62/228.4 |
| 4,463,348 | 7/1984 | Sidebottom | 340/585 |
| 4,694,295 | 9/1987 | Miller et al. | 340/903 |
| 4,695,823 | 9/1987 | Vernon | 340/449 X |
| 4,790,143 | 12/1988 | Hanson | 62/126 |
| 4,798,055 | 1/1989 | Murray et al. | 62/127 |
| 4,816,803 | 3/1989 | Brown | 340/426 |
| 4,819,441 | 1/1989 | Hanson | 62/160 |
| 4,882,564 | 11/1989 | Monroe et al. | 340/449 |
| 4,903,498 | 2/1990 | Hanson | 62/126 |
| 4,903,500 | 2/1990 | Hanson | 62/156 |
| 4,903,502 | 2/1990 | Hanson | 62/228.5 |
| 4,949,550 | 8/1990 | Hanson | 62/126 |
| 4,970,496 | 11/1990 | Kirkpatrick | 340/585 |
| 5,123,252 | 6/1992 | Hanson | 62/89 |
| 5,181,389 | 1/1993 | Hanson et al. | 62/126 |

FOREIGN PATENT DOCUMENTS

| | | | |
|---|---|---|---|
| 0122866 | 10/1984 | European Pat. Off. | 346/33 TP |
| 2069137 | 8/1981 | United Kingdom | 346/33 TP |
| 2152673 | 8/1985 | United Kingdom | 374/186 |

*Primary Examiner*—John K. Peng
*Assistant Examiner*—Thomas J. Mullen, Jr.
*Attorney, Agent, or Firm*—Willian Brinks Hofer Gilson & Lione

[57] ABSTRACT

A refrigerated vehicle system is particularly adapted for use with refrigerated tractor/trailer and rail car vehicles to provide data on the operation of the vehicle and to monitor and provide a record of the operation of ancillary equipment important in the proper refrigeration of the vehicle. With refrigerated vehicles, the system can provide records of the temperatures of articles when loaded into the refrigerated vehicle, throughout their transportation and upon delivery from the vehicle and can monitor refrigerated vehicles, store information on the refrigeration of the vehicles, including time/temperature records and information of the operation and status of refrigeration system components, and output such information to remote and distant locations.

27 Claims, 20 Drawing Sheets

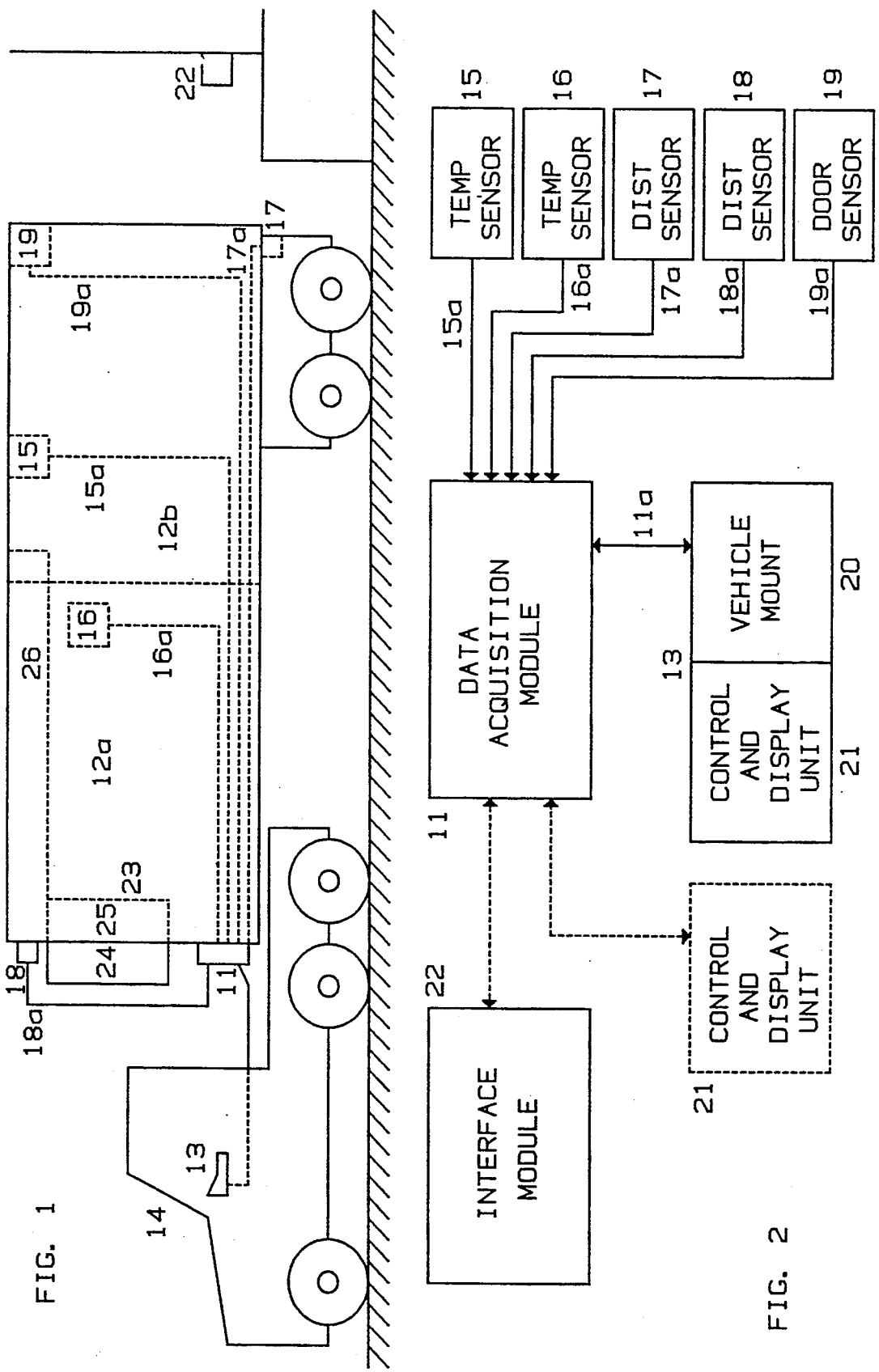

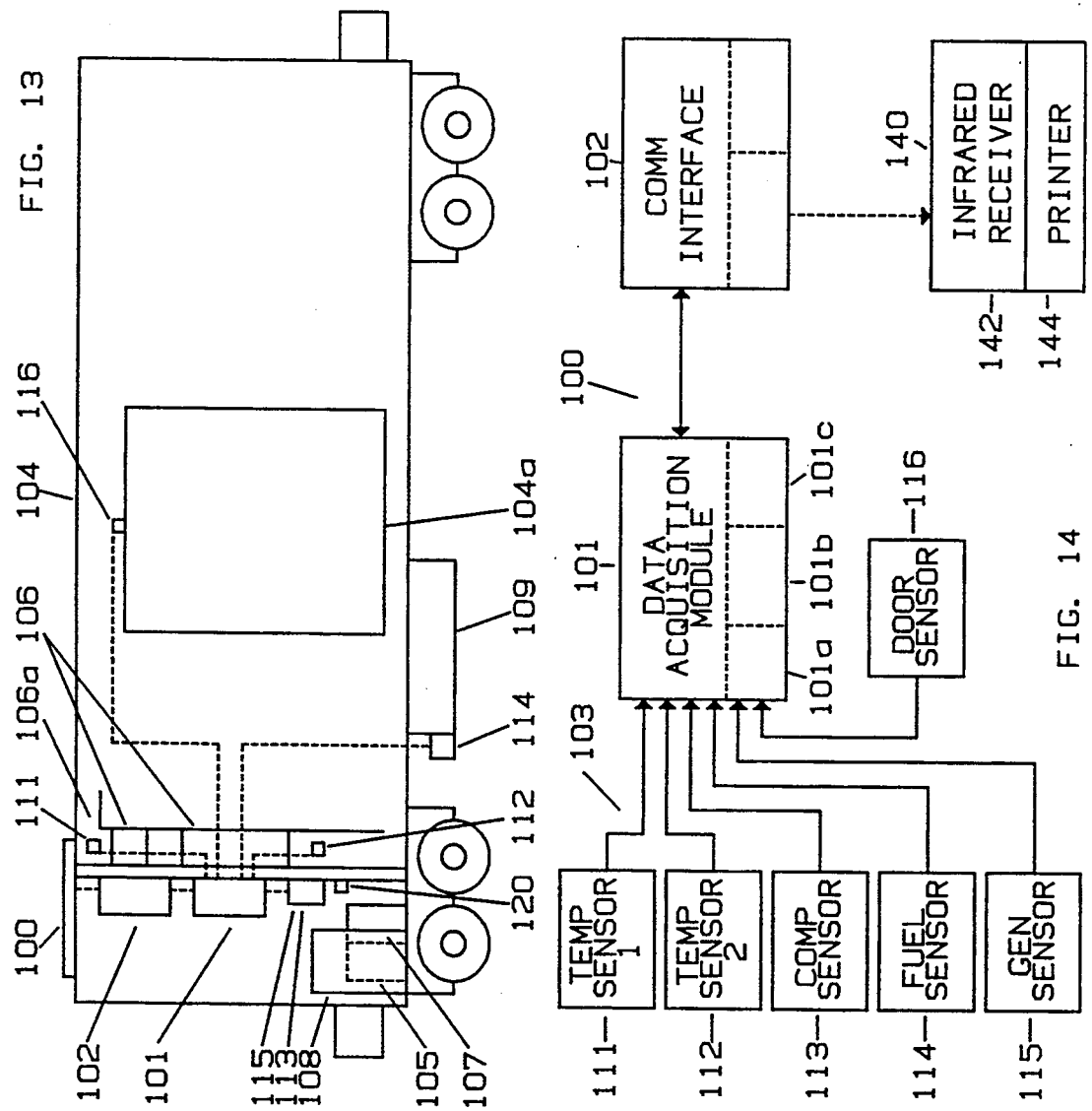

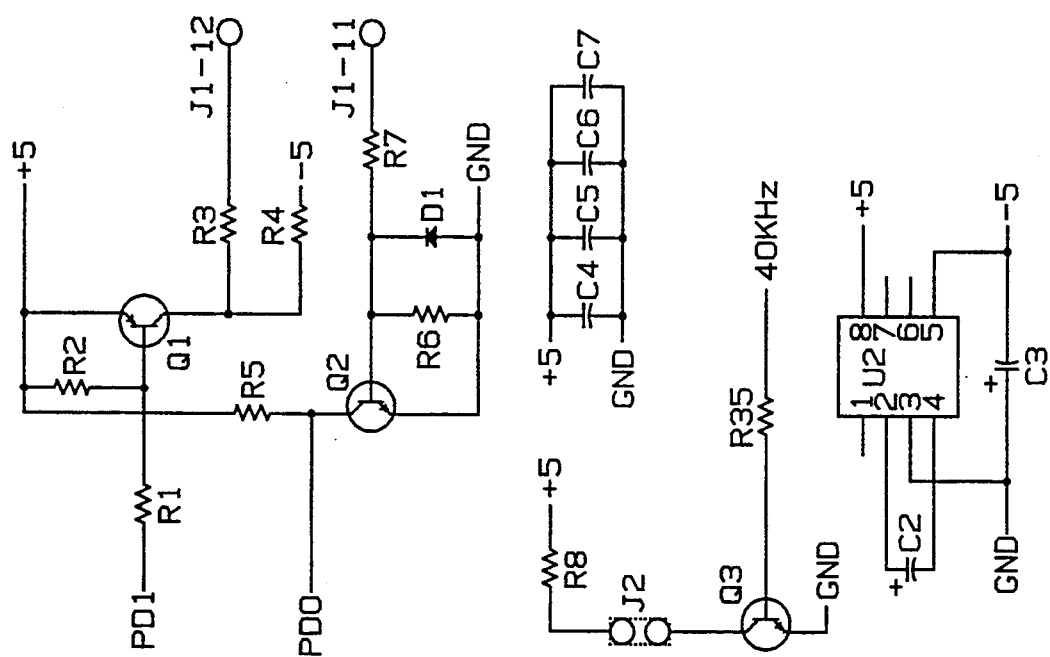
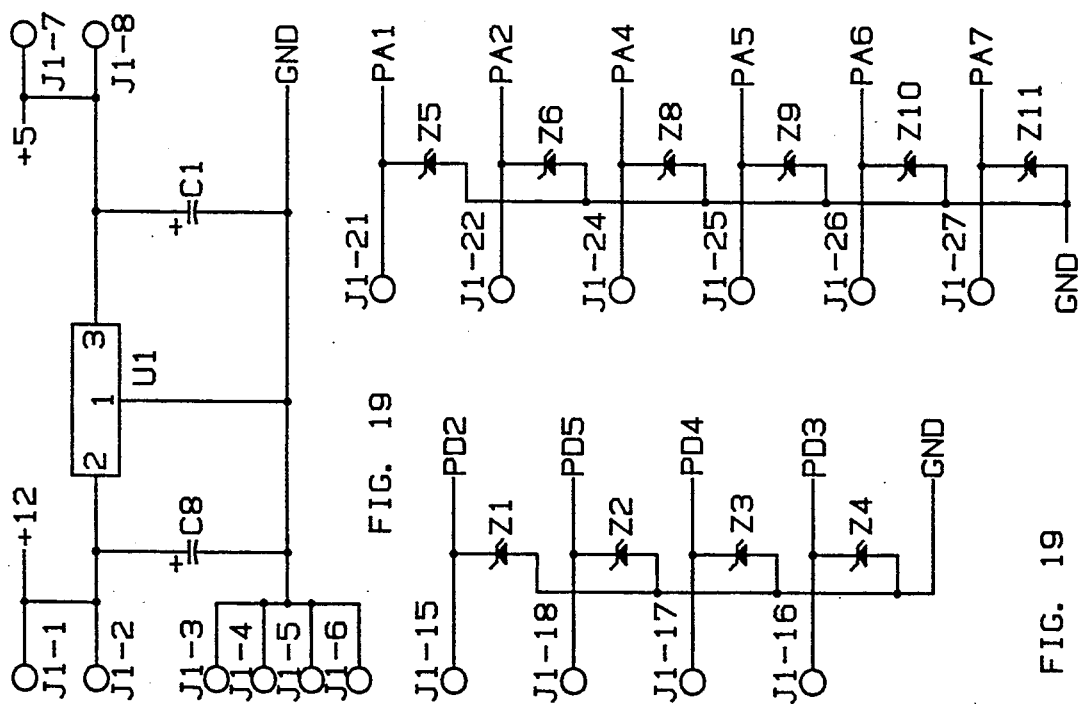
FIG. 19

MONITORING SYSTEM FOR A REFRIGERATED VEHICLE

This is a continuation in part of U.S. patent application Ser. No. 07/404,786 filed Sep. 8, 1989 now U.S. Pat. No. 4,970,496 issued Nov. 13, 1990 to Kirkpatrick and was filed as International Application PCT/US90/4800 on Aug. 22, 1990.

TECHNICAL FIELD

This invention relates to systems for monitoring the operating conditions of refrigerated vehicles, including systems to monitor and to assist in the operation of refrigerated tractor/trailer and rail car vehicles, with the capability, for example, of providing operating data and time/temperature records for refrigerated vehicle compartments and their contents to remote locations by transportation or by radio communications.

BACKGROUND ART

A number of systems have been suggested for sensing the temperature within a refrigerated trailer and providing an output dependent upon the temperature within the trailer.

U.S. Pat. No. 4,024,495, for example, discloses a remote temperature-warning system for refrigerated vehicles that uses the existing electrical wiring of the vehicle. A visual temperature indicator is installed within the cab of the tractor to allow the driver to continuously monitor the temperature within the refrigerated compartment. An audio alarm is activated when the temperature measured within the refrigerated compartment exceeds a predetermined temperature.

U.S. Pat. No. 4,385,289 discloses a system for sensing the temperature within a refrigerated trailer and actuating an alarm when the temperature exceeds a preselected temperature. This system includes a control for switching between off, test and alarm modes of the system.

U.S. Pat. No. 4,463,348 discloses a microprocessor based monitor and display system for a refrigerator, which senses the actual time the refrigerator door is open, accumulates a count representative of the amount of door open time occurring in a plurality of successive time segments, calculates a rolling average of door open time, and can provide a visual display to indicate when the rolling time average is greater than, less than or within predetermined normal range.

U.S. Pat. No. 4,790,143 discloses a refrigeration monitoring system for truck trailers and containers, including programmable logic array, microcomputer or discrete gate logic systems connected with a plurality of sensors for temperatures from the refrigerated compartment for the air leaving and entering the evaporator, for compressor operating conditions and with a defrost signal. The monitor provides a warning if it detects marginal or inefficient operation and, after a preset time, a shutdown signal.

U.S. Pat. No. 4,798,055 discloses a portable, hand-operable refrigeration system analyzer. The disclosed apparatus includes a temperature probe, adapted for normal placement at each of a plurality of preselected points, in turn, around a refrigeration loop, connected by cable with a hand held means including a microprocessor for reading and storing probe temperature measurements, for storing standards and ranges of temperature data for properly operating refrigeration systems, and for comparison and diagnostic programs, and further including a key pad and alphanumeric display for entering data and operating the programs. The apparatus is provided with an output for feeding temperature and analysis data to external recording devices.

U.S. Pat. No. 4,882,564 discloses a system for remotely monitoring temperature including a temperature sensor, a transmitter unit located in the refrigerated transport container, and a display and alarm unit remote from the temperature sensing unit. The display and alarm unit includes a microprocessor, a RAM to store program instruction and data, and a RAM to store intermediate results and data. The display and alarm unit generates visual and aural alarms if the sensed temperature is outside of limits for a predetermined length of time.

DISCLOSURE OF THE INVENTION

This invention is a system with multiple capabilities to monitor the operation of a refrigerated vehicle system and is particularly adapted for use with refrigerated tractor/trailer and rail car vehicles to provide data on the operation of the vehicle and to monitor and provide a record of the operation of ancillary equipment important in the proper refrigeration of the vehicle. With refrigerated vehicles, the system of the invention can provide records of the temperatures of articles when loaded into the refrigerated vehicle, throughout their transportation and upon delivery from the vehicle.

The invention includes systems to monitor refrigerated vehicles, to store information on the refrigeration of the vehicles, including time/temperature records and information of the operation and status of refrigeration system components, and to output such information to remote and distant locations.

The invention includes, for example, a system to monitor refrigerated rail cars and to transmit information and warnings related to temperatures and refrigeration system operation and failure by radio link to a distant monitoring station. In its preferred embodiment, such an exemplary system includes means for measuring and storing data on the temperature within the refrigerated vehicles, or rail car, and data on the refrigeration equipment, including any stored fuel necessary to operate the refrigeration equipment, and means for periodically, or upon demand, transmitting such information to a remote monitoring station by radio communications means, for example, by a PEGASUS MESSAGE SYSTEM VHF transceiver. Preferred systems have the further ability to analyze data from the refrigerated vehicle and generate and communicate status signals, reports and alarms indicating, for example, such conditions as unacceptable temperatures within the vehicle, failure of the refrigeration system components, and low fuel for the refrigeration equipment. Communication of such status signals, reports and alarms to a remote location can be through a satellite uplink and radio communications and/or by a infrared optical transmitter on the outside of the refrigerated vehicle.

A system of the invention can comprise a first means, or data acquisition module, for acquiring and storing time/temperature data related to the refrigeration of the vehicle; and a second means, or control and display module, for providing data to a vehicle operator relating to operation of the vehicle refrigeration equipment; for providing control of the system by the vehicle operator; for outputting information related to refrigeration of the vehicle, including time/temperature data and for warning the vehicle operator of unacceptable conditions of operation.

In refrigerator tractor/trailer vehicles, the first means, or data acquisition module, is connected with one or more temperature sensors adapted for measurement of the temperatures within the trailer and may be connected with one or more sensors adapted to detect the operation of components of the refrigeration system and the doors located in the trailer. Such a data acquisition module preferably comprises a microprocessor and random access memory connected with a plurality of such sensors and adapted to acquire stored data on temperatures within the trailer and further connected with clock means to provide time data associated with the temperature data. In such systems, the second means, or control and display module, can provide temperature data to the vehicle operator and time/temperature printouts, warnings to the vehicle operator if the temperature of the trailer approaches unacceptable limits, warnings if refrigeration system components are not functioning properly and warnings if the trailer doors are opened without authority. The control and display module provides controls for operation of the system, a digital readout, and an audible alarm and preferably comprises a microprocessor and random access memory that connect with the data acquisition module.

Such a second means can comprise a separate portable control and display module and a vehicle mounting unit, both adapted for connection to the data acquisition module. The separate portable control and display module comprises means for accepting and storing data relating to the operation of the ancillary equipment, including a time/temperature record of the interior of the refrigerated trailer, means for programming and providing information to the data acquisition module, and means for presenting data retrieved from the data acquisition module. The separate portable control and display unit of the invention may include a hand held temperature probe adapted for connection with the data acquisition module, permitting the temperature of articles to be carried in the refrigerated compartment to be stored in the data acquisition module as the articles are loaded into the refrigerated compartment. Such a portable control and display unit may comprise means to measure and store article temperatures and the times the article temperatures are sensed, means for visually displaying the article temperatures, and means to accept and store data from the data acquisition model.

The system of the invention may be provided with a separate interfacing means for reading and transmitting data stored in the data acquisition module, such as temperature and time data relating to a refrigerated compartment, to a second remote location, such as a remote located data processor or computer. Such interfacing means can comprise a multiplexer to provide multiple channels of data for acceptance by a single computer or a radio transmitter and antenna to transmit such data to a distant monitoring station, or an infrared transmitter on the outside of the vehicle.

Other features of the invention will be apparent from the drawings and description of the best mode of carrying out the invention which follow.

BRIEF DESCRIPTION OF THE DRAWINGS

FIG. 1 is a diagrammatic illustration of a system of the invention incorporated into a tractor/trailer vehicle;

FIG. 2 is a block diagram of a simple system of the invention;

FIG. 13 is a diagrammatic illustration of a system of the invention incorporated into a refrigerated rail car;

FIG. 14 is a block diagram of the system of FIG. 13;

FIGS. 16 to 22 are circuit diagrams of the system of FIG. 14.

BEST MODE FOR CARRYING OUT THE INVENTION

Figure 3:
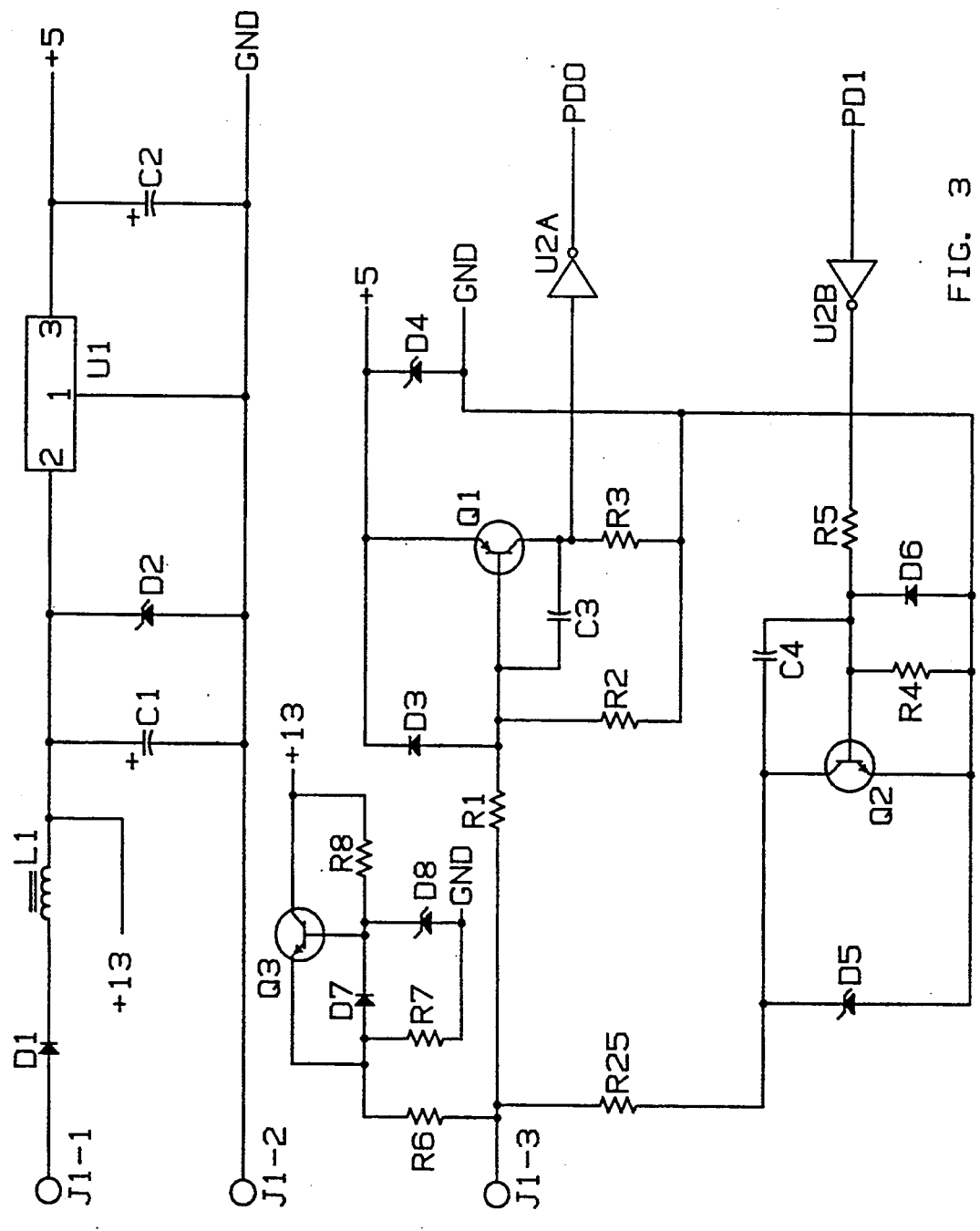
FIGS. 3-5 are circuit diagrams of a data acquisition module of the system of this invention.

FIGS. 1 and 2 disclose a preferred embodiment of the invention as installed in a tractor/trailer vehicle. As shown in FIGS. 1 and 2, a preferred system 10 of the invention may include a data acquisition module 11, shown installed on a trailer 12; a control and display module 13, shown installed in the cab of a tractor 14; one or more temperature sensors 15, 16, shown installed in trailer 12; one or more distance sensors 17, 18, shown installed on the trailer 12; and one or more door open sensors 19, also shown installed in trailer 12. As shown in FIG. 1, a plurality of sensors 15-19 is connected with the data acquisition module 11 by appropriate cabling or wiring 15a-19a, respectively. The data acquisition module and control and display module 13 are interconnected by appropriate cabling 11a from data acquisition module 11 at the front of trailer 12, to the control and display module 13 within tractor 14, as shown in FIG. 1.

As set forth below, control and display module 13 includes separate, portable, data acquisition, storage and presentation unit 20 and vehicle mounting unit module 21. The separate portable control and display unit 21 is shown as detached from the vehicle mounting unit in dashed lines in FIG. 2.

The preferred embodiment of the invention described below is adapted to acquire and store data relating to ancillary refrigeration equipment 23 of trailer 12. For purposes of illustration of the invention, trailer 12 comprises a refrigerated trailer including a freezer compartment 12a in which temperature sensor 16 is located and a refrigerated compartment 12b in which temperature sensor 15 is located. Ancillary refrigerating equipment 23 comprises a compressor unit 24 located outside trailer 12 and an associated evaporator unit 25 located within freezer compartment 12a of trailer 12. Cold air for refrigerator compartment 12b is provided from evaporator 25 by a duct 26 which directs the cold air into refrigerator compartment 12b. In this preferred embodiment of the invention, system 10 is adapted to provide time/temperature records of the temperature within freezer compartment 12a, as sensed by sensor 16, and of refrigerated compartment 12b, as sensed by sensor 15. Although the system illustrated by FIGS. 1 and 2 includes specifically two temperature sensors, any one or a plurality of temperature sensors may be used to provide information to the data acquisition module. In addition to temperature sensors for the air within a plurality of zones of refrigeration within a refrigerated vehicle, sensors may be placed on or at the compressor unit 24 and evaporation unit 25, and within or on articles being carried within the refrigerated vehicle to provide a time/temperature record of article temperature and an indication of the temperature of the articles being carried. In addition to monitoring temperatures within trailer 12, the exemplary systems shown in FIGS. 1 and 2 can record the time at which doors 12c of trailer 12 are opened and closed. The invention thus permits monitoring of ancillary vehicular equipment; and as shown in FIG. 1, is particularly valuable in monitoring the operation of refrigeration equipment 23 and the insulation provided in trailer 12 to maintain the articles loaded in trailer 12 at acceptable temperatures.

Figure 4:
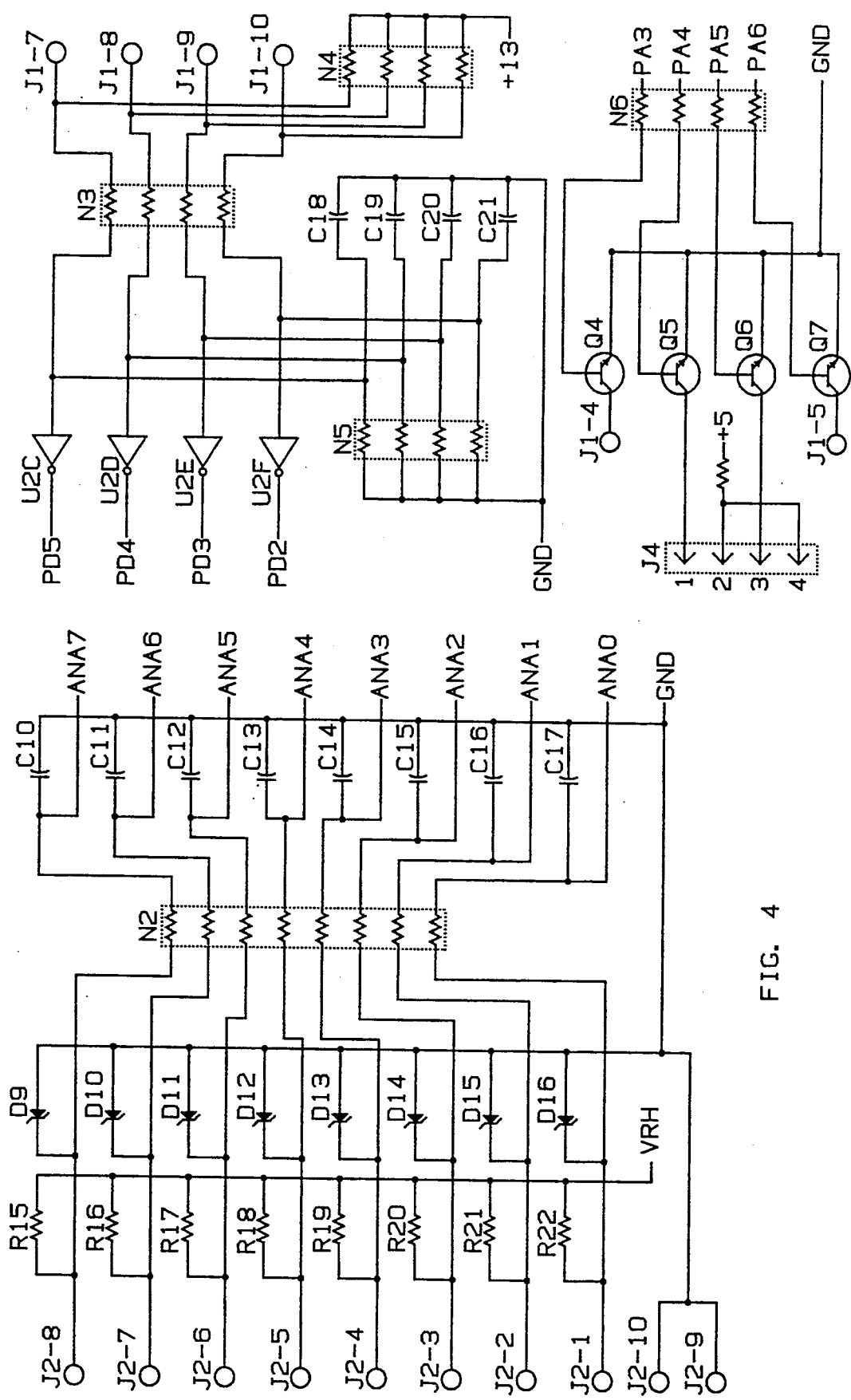
Figure 5:
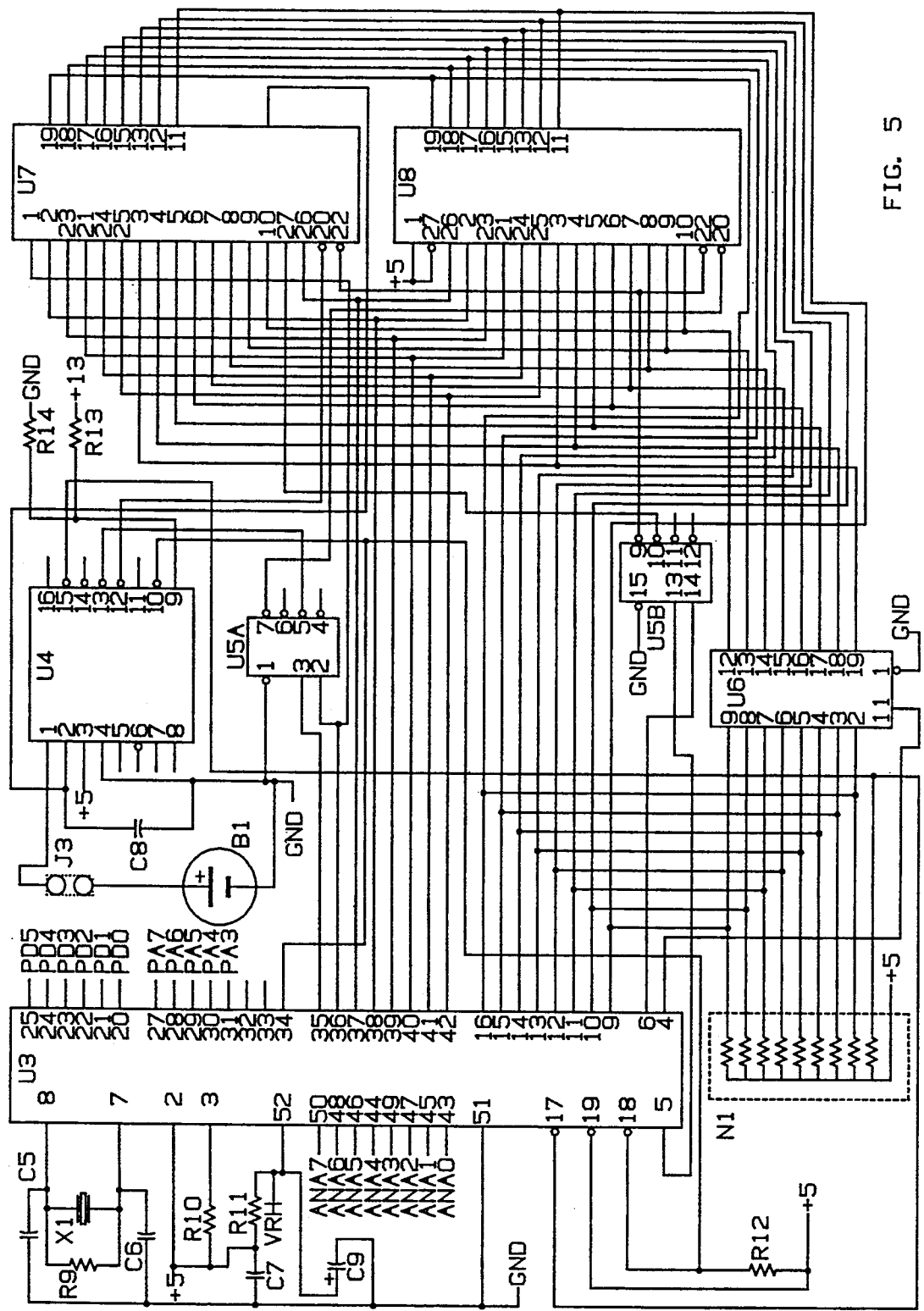

FIGS. 3, 4 and 5 are circuit diagrams of data acquisition unit 11 of this invention. The circuit of data acquisition module 11 shown on FIGS. 3, 4 and 5 is interconnected as indicated on the drawings. FIG. 3 shows the means supplying power to the circuit including a regulated five-volt D.C. output from a 3.5-volt D.C. input. Circuit portions shown on FIG. 3 include connections PD0 and PD1 which connect to the PD0 and PD1 connections, shown in FIG. 5, for the microprocessor unit U3 which is sold by Motorola under its No. 68HC11. The connections ANA0-ANA7 of microprocessor U3, shown in FIG. 5, connect with the corresponding ANA0-ANA7 connections shown in the circuit portion at the left of FIG. 4. The connections PA3-PA6 of microprocessor U3 shown in FIG. 5 connect to the corresponding connections PA3-PA6 of the circuit portion shown at the left of FIG. 4. The connections PD2-PD5 of microprocessor U3 shown in FIG. 5 connect respectively to connections PD2-PD5 of the circuit portion shown at the right of FIG. 4.

The terminals indicated by prefixes J1 and J2 (i.e., J1-1 through J1-12 and J2-1 through J2-12) indicate connector terminals for interconnection with other modules of the system.

The data acquisition circuit of FIGS. 3-5 is contained within an integrated data acquisition module designed to mount on the front of a refrigerated trailer as shown in FIG. 1 and to draw its operating power from refrigeration unit 23. Data acquisition module 11 is capable of measuring up to eight temperatures and/or pressures throughout the trailer system and recording up to one thousand time/temperature/pressure measurements automatically over selectable time periods from a few hours to several months. The time/temperature or time/pressure records are maintained even if the trailer battery is removed for maintenance. To conserve power, however, recording activity is stopped when the battery is removed.

Data acquisition module 11 is provided with connections for communication with other modules and computers that may attach to the system of the invention. For example, data acquisition module 11 is provided with connections permitting it to be connected with control and display module 13, which can serve as a remote display unit in the tractor of the tractor/trailer; with the portable control and display unit 21; with handheld temperature probes, which can measure and record the temperatures of articles stored in the trailer directly; and with a central computer system of the trucking company. Data acquisition module 11 may be provided with a radio pager alarm to send alarms to the driver in the event the temperature of the trailer approaches unacceptable limits or the doors of the trailer are opened without authority. Data acquisition module 11 may also be programmed to provide alarms for high or low temperatures and for abnormal behavior of the compressor or evaporator of the refrigeration unit. Data acquisition module 11 may be programmed from the control module 13 when mounted in the tractor or from the portable control and display unit 21. Each data acquisition module can be provided with a unique identifying number accessible by a central computer system to allow tracking of the trailers in which the data acquisition module is installed. The data acquisition modules of FIGS. 3-5 provide the ability to monitor and diagnose abnormal compressor behavior by the installation of sensors to monitor compressor inlet and outlet pressures and compressor motor operating temperatures. By monitoring the compressor for abnormal behavior, impending compressor failures may be predicted while product temperatures are still within acceptable limits; and remedial action can be taken before refrigerated trailer loads are lost.

Data acquisition module 11 of the invention is preferably packaged in small, aluminum, weatherproof enclosures with an alarm indicator and connections for handheld module 21, interfacing module 22, and a plurality of sensors such as those shown as sensors 15-19 in FIGS. 1 and 2. Data acquisition module 11 can be designed to operate over the entire SE recommended external pressure range of $-40°$ to $-185°$ F. ($-40°$ to $-85°$ C.).

As shown in FIG. 5, data acquisition module 11 also includes clock means for providing time data to the microprocessor. The microprocessor is programmed in a manner known in the art to sample the output of the system sensors and record the sensor outputs and the time associated with each of the outputs. The sensors may be any temperature or pressure sensors that are adapted to provide digital outputs of the temperature or pressure they sense. While the use of sensors with digital outputs is preferred, analog sensors may be used; and the data acquisition module may be provided with analog-to-digital conversion means to provide digital data to the microprocessor. The data acquisition module of FIGS. 3-5 thus provides means for acquisition storage of data connected with one or more temperature transducers, pressure transducers or other transducers that can monitor the operation of ancillary vehicular equipment and is particularly adaptable to provide time/temperature records of the compartments and contents of refrigerated tractors and other vehicles.

As indicated in FIG. 1, data acquisition module 11 may be connected with ultrasonic distance sensors 17 and 18. Such distance sensors may be ultrasonic sensors of the type available from Polaroid Corporation which operate by projecting a sound pulse and sensing a return pulse to permit distance calculation from the time interval and the speed of sound. The system of the invention is thus provided with means to permit the vehicle operator to monitor the distance between the back of the trailer where distance sensor 17 is located, as shown in FIG. 1, and a loading dock or other object as a tractor/trailer is being backed. In addition, a vehicle operator may use sensor 18 mounted at the top of the trailer to determine clearances between the top of the trailer to determine clearances between the top of trailer 12 and bridges and overpasses under which trailer 12 must pass. Such distance information may be displayed on the control and display module 13 within tractor 14 as described below.

FIGS. 6-10 include the schematics of the circuit which may be incorporated into the control and display module 13, portable, control and display unit 21 and vehicle mounting unit 20.

Figure 6:
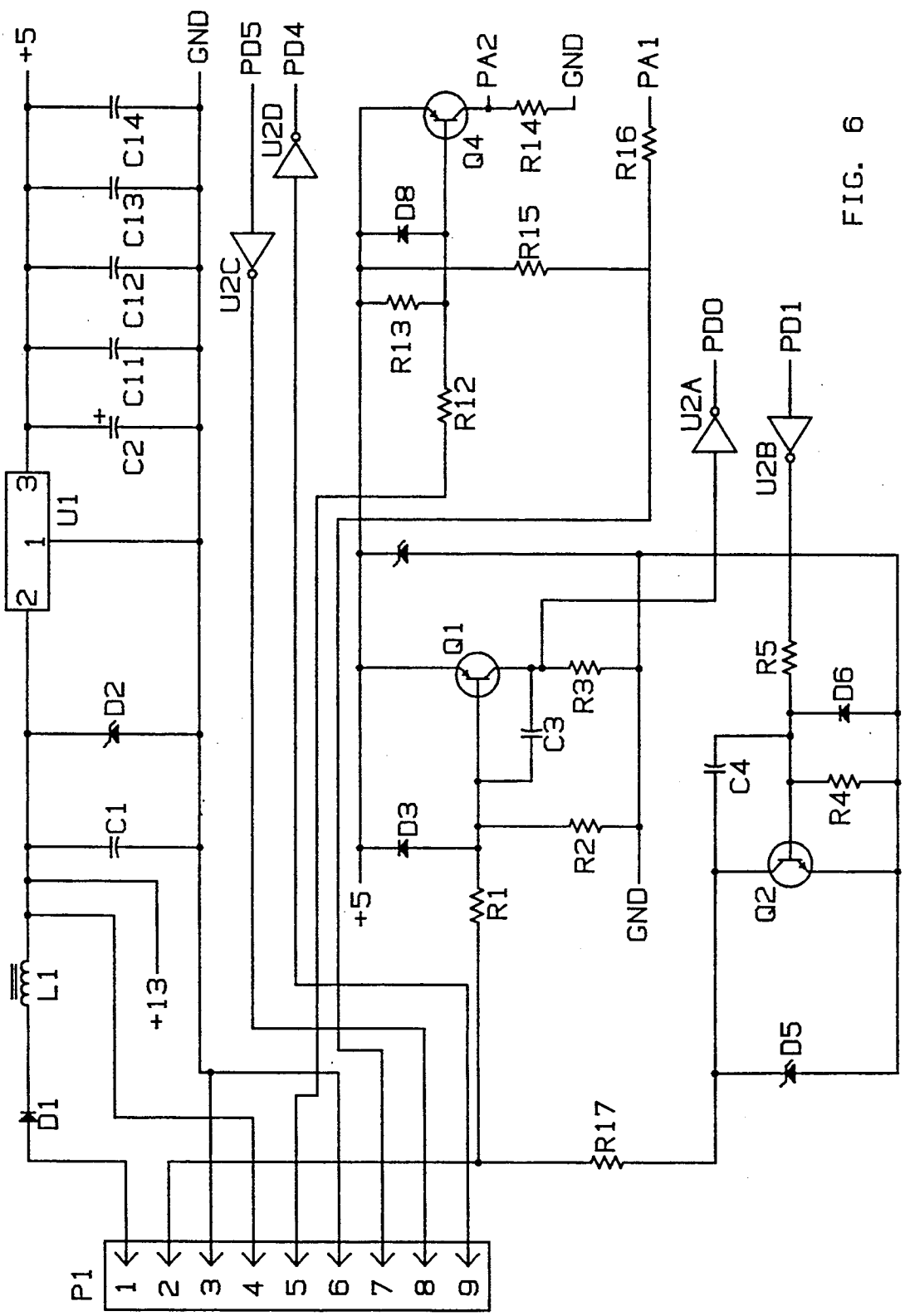
FIGS. 6-10 are circuit diagrams of a control and display module of this invention.

The circuit portions shown on FIGS. 6–9 are interconnected at the corresponding terminals identified on each of the drawings and together comprise the circuit of the separate portable control and display unit 21. The connections PD0, PD1, PD4 and PD5 are connected with the corresponding terminals PD0, PD1, PD4 and PD5 of the microprocessor IC7 shown in FIG. 8. The microprocessor IC7 is preferably a microprocessor sold by Motorola under its No. 68HCL. As shown in FIG. 6, the circuit of FIGS. 6–9 is powered by a 13.5-volt D.C. input from the vehicle mounting unit 20 shown in FIG. 10 and provides a regulated, positive five volts for the operation of the circuit elements. The circuit of FIGS. 6–9 may also be battery powered for portable operation.

Figure 7:
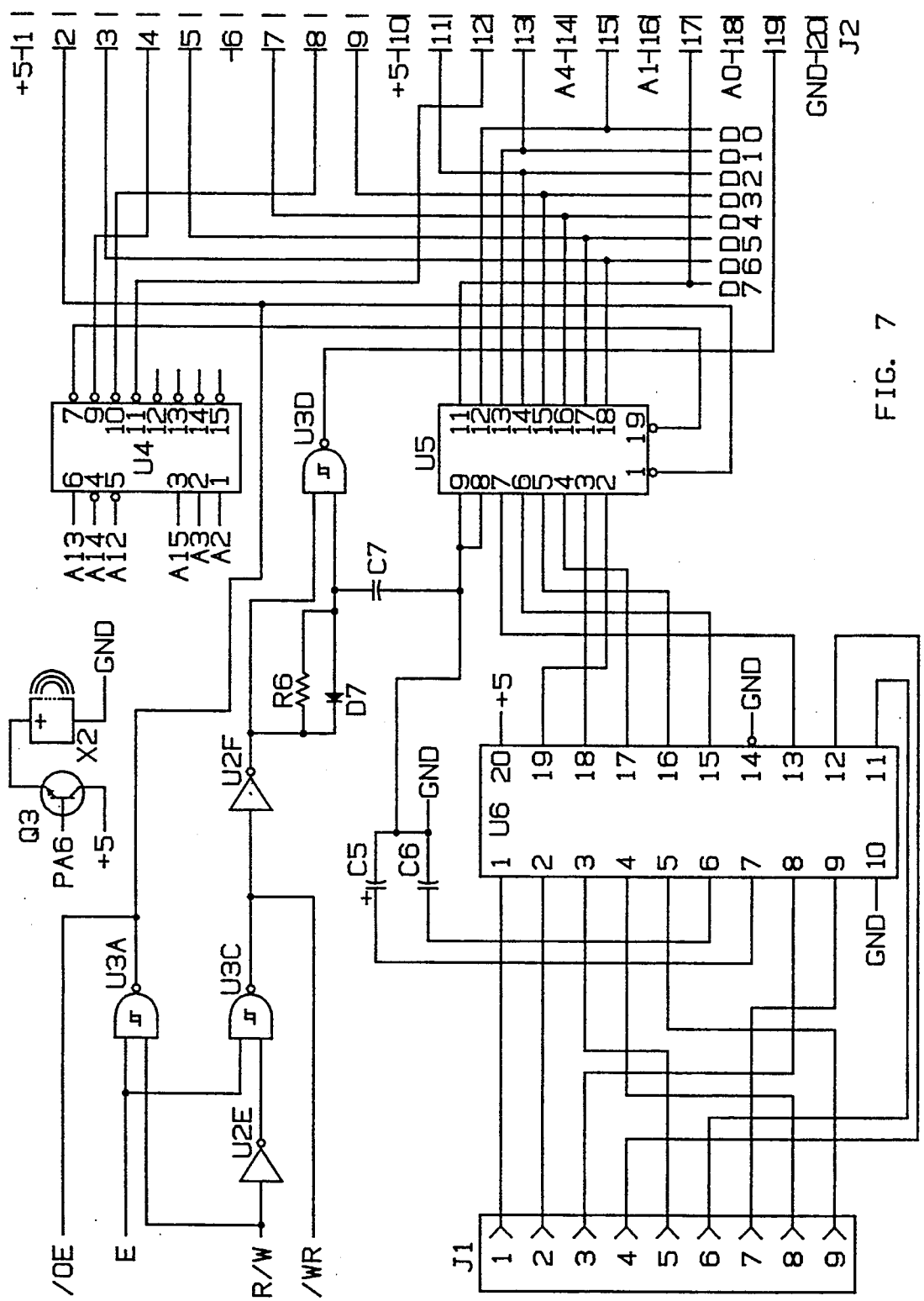
Figure 8:
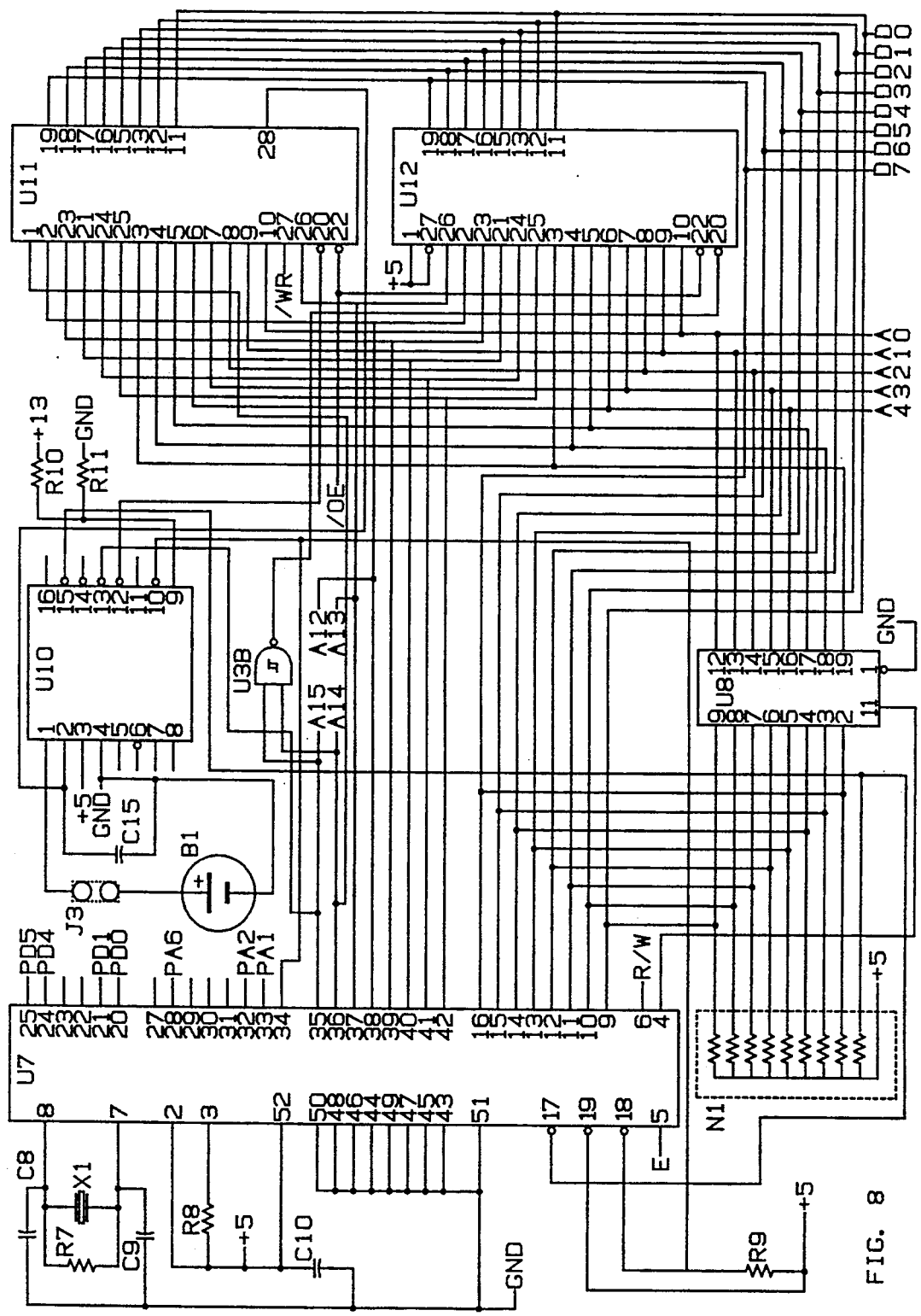

Line terminations D0–D7 at the right of the circuit portion shown on FIG. 7 connect respectively to the line terminations identified by D0–D7 at the upper right of the circuit portion shown in FIG. 8. The connections A12–A15 from IC4 at the upper center of the circuit portion shown on FIG. 7 connect to the corresponding line terminations A12–A15 located in the central portion of the circuit portion shown in FIG. 8. The line terminations A2 and A3 of circuit element IC4 of FIG. 7 connect to the line terminations A2 and A3 respectively shown at the bottom of the circuit portions shown in FIG. 8. The circuit line terminations A0, A1 and A4 at the bottom of the circuit portion shown in FIG. 8 connect to the corresponding terminals A0, A1 and A4 shown at the right of the circuit portion shown on FIG. 7 (at the terminals of connection J2 pins 18, 16 and 14, respectively). Connector J1 at the lower left of the circuit portion shown in FIG. 7 is adapted for connection with a keyboard to input information. Such a keyboard may be of the type manufactured by the Grayhill Company and sold under its part No. 86JB2-2-1. The connection J2 provides the means to interconnect the circuit of FIGS. 6–9 with data acquisition module 11.

Figure 9:
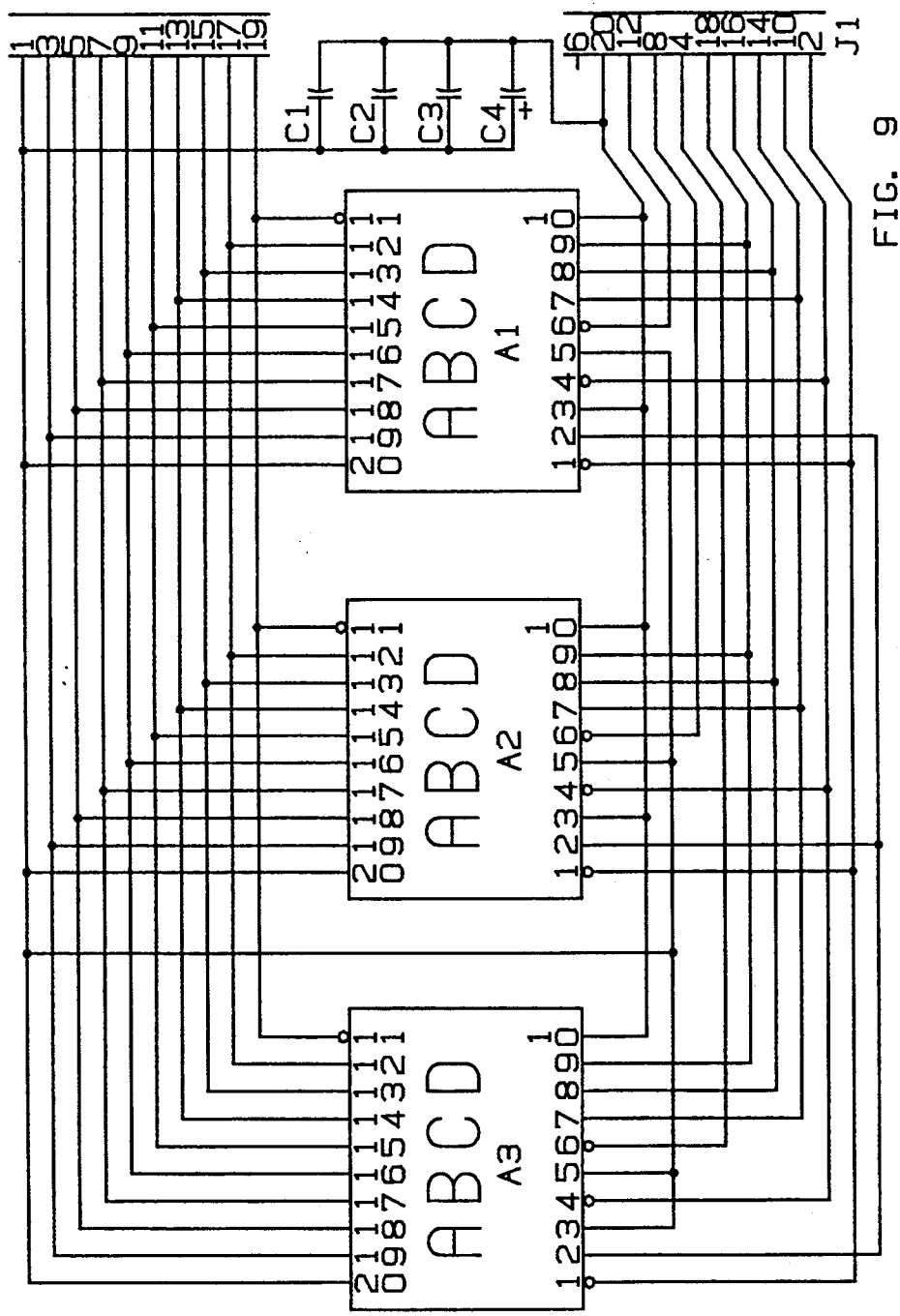

FIG. 9 shows a display board for use with FIGS. 6–8 to display temperature, pressure or distance information available from data acquisition module 11. It should be noted that the circuit of FIGS. 6–9 provides the control and display unit 21, whether separate or mounted in a tractor with a 12-character, illuminated display, a 20-button key pad, and a vehicular network interface. The circuit of FIGS. 6–9 is preferably packaged in a separate, handheld unit that is portable and may be carried by the vehicle operator. As a handheld unit, the circuit of FIGS. 6–9 may be plugged directly into the data acquisition module 11 when the trailer is parked; and the data acquisition module may be programmed to provide alarms in the event the outputs of any of its sensors indicate unacceptable operating conditions. In addition, when the circuit of FIGS. 6–9 packaged as a separate, handheld unit is plugged directly into the data acquisition module, the history of operation of the ancillary, vehicular equipment may be downloaded into the handheld unit. Handheld units incorporated the circuit of FIGS. 6–9 have sufficient information storage to interrogate up to eight data acquisition modules 11 in sequence. The handheld unit may be used to carry the history of operation of the ancillary equipment, for example, the time/temperature records associated with a refrigerated trailer to a computer or other data processor located at a remote location. In addition, such information may be transmitted over a telephone link to remote computers by means of modems and telephone lines. The 12-character alphanumeric provides English menu prompts to minimize operator training time.

Figure 10:
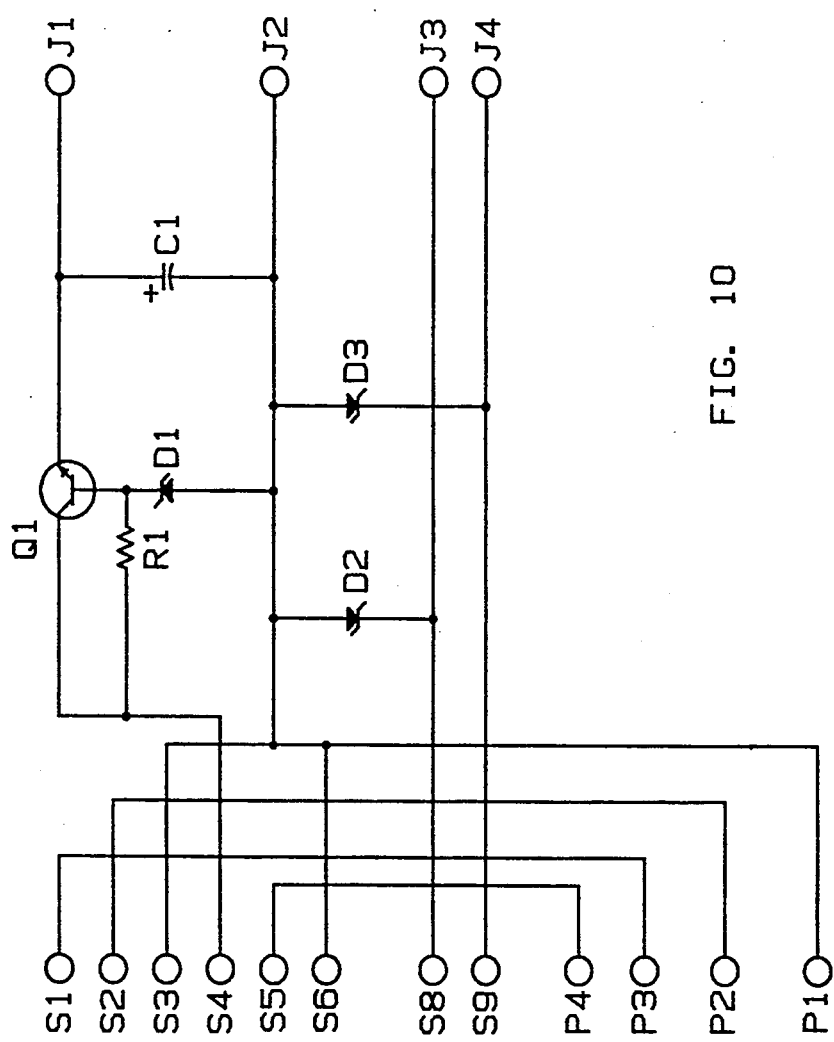

FIG. 10 is a schematic diagram of the vehicle mounting unit 20, including a printer interfacing circuit of operator control module 13. The vehicle mounting unit 20 may be permanently mounted in a tractor cab to provide a connection indicated by DE9S on FIG. 10 for the portable control and display unit including the circuit of FIGS. 6–9. The cab mount and printer including the circuit of FIG. 10 provide a 24-column printer with a power supply for printing alarm and temperature history records. The printer is preferably a Weightronics printer sold with as its No. 3602-1200-DC and uses plain two and one-half inch adding machine paper that is conveniently available.

When handheld display unit 21, including the circuit of FIGS. 6–9, is ill place in the printer mount unit, the circuits of FIGS. 6–9, and FIG. 10 are interconnected by the connector DE-9 shown at the left of FIG. 6 and the left of FIG. 10. The handheld display unit and circuit of FIGS. 6–9 may be provided with a replaceable nine-volt lithium battery which can provide an expected battery life of six months with normal usage.

The portable control module 21 may also be provided with a stainless steel article temperature probe which may be used to probe article temperatures, both while attached by interfacing cable to the data acquisition module 11 or while detached for use in a warehouse or storage facility. The handheld display unit 21 has the capability of recording up to twelve time and temperature measurements and storing the time and temperature measurements for later uploading them into data acquisition module 11 or to a remote computer at a later time. The handheld display unit 21 includes clock means and may also be provided with means to present time information and wake up or time alarm signals to the vehicle operator.

Figure 11:
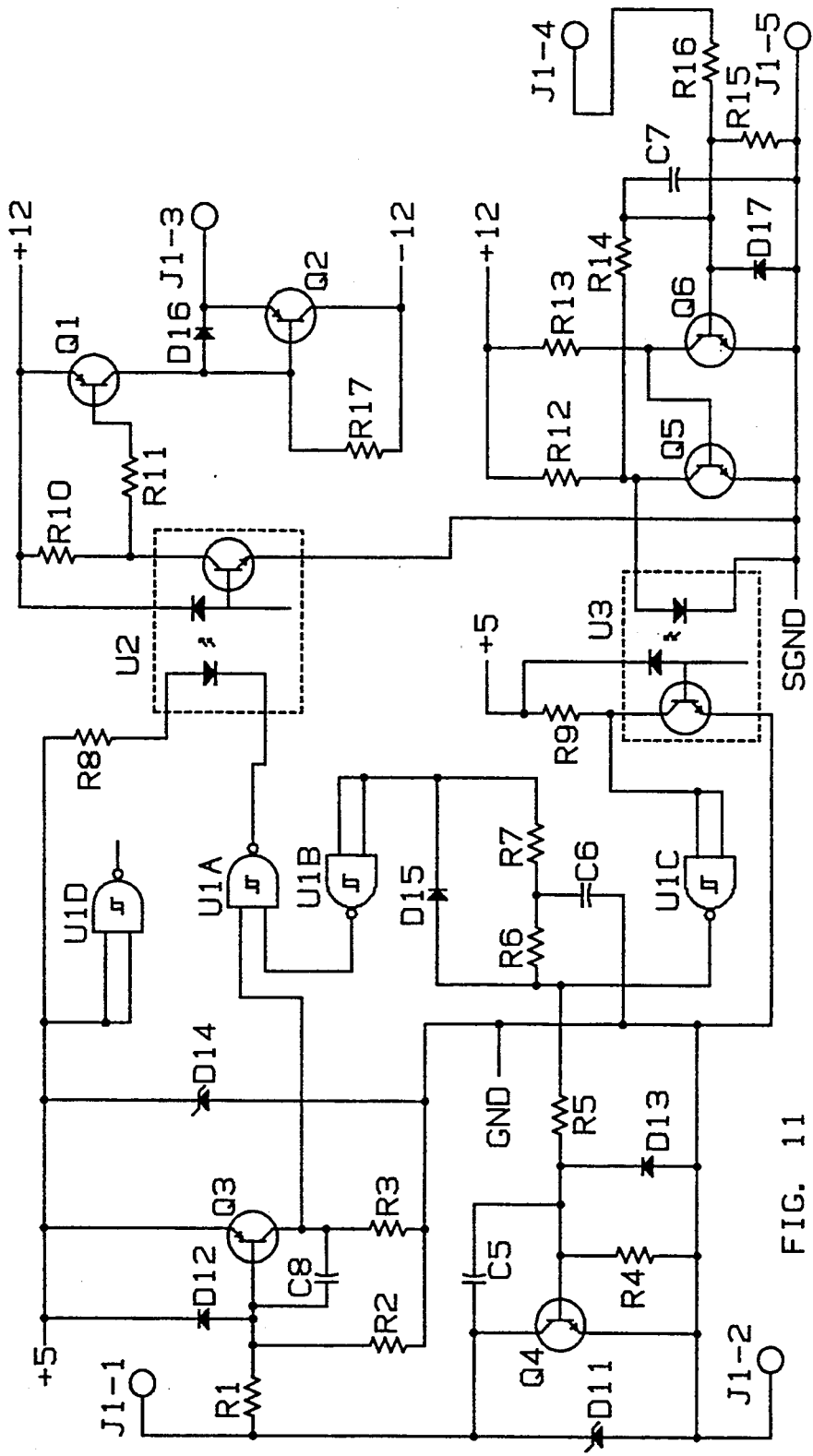
FIGS. 11 and 12 are circuit diagrams of an interface module of the system of this invention.
Figure 12:
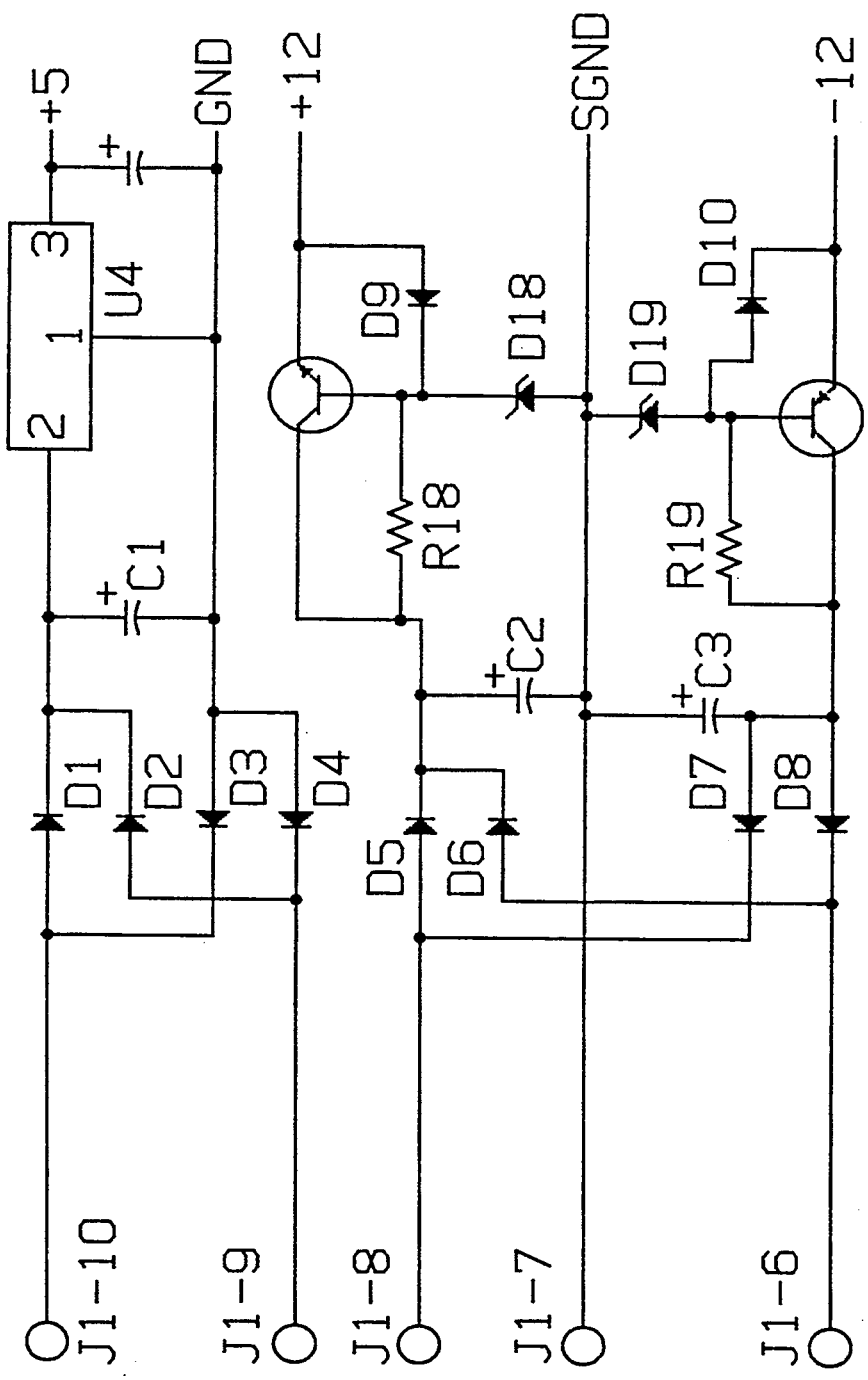

As indicated above, the system can also include an interface module 22 (FIG. 1) which is adapted to permit the data acquisition module 11 to interface with a standard RS232 data link. Such an interfacing module may be mounted inside a building or near a loading dock and can be powered from the building electrical system. FIGS. 11 and 12 are circuit diagrams of the circuit of such an interface module 22. The module of FIGS. 11 and 12 provides level translation and isolation between the building computer system and the electrical system of the vehicle. As indicated above, the interfacing module may be located inside a warehouse or unloading facility and wired to a 2183A weather-proof receptacle adjacent the unloading dock and may be plugged directly into data acquisition module 11 on parked trailer 12. The RS232 output side may be wired directly to a personal computer or to a computer remotely located at a distance of up to ne hundred feet. A 2141A or 2142A multiplexer may be used to provide up to seven or fifteen channels, respectively, into a single personal computer serial port. For distances over 100 feet, a 143A line driver transceiver pair is used.

FIGS. 13 and 14 illustrate a system of the invention adapted to monitor the operation of a refrigerated rail car including the components of the system by which it is refrigerated. FIG. 13 is a diagrammatic representation of the rail car to illustrate the system of the invention. FIG. 14 is a block diagram illustrating the basic elements of the system of FIG. 13.

As shown in FIGS. 13 and 14, the system 100 of the invention includes a first means 101 for the acquisition and storage of data, a second means 102 for communication of the data to a remotely located receiving station and a plurality of sensors 103 for monitoring the refrigeration of the rail car 104 and the components of its refrigeration system including, but not limited to, a compressor 105, an evaporator fan 106 and a power source 107 to drive the compressor 105, the evaporator fan 106 and, if necessary, the elements of the system of this invention. The power source for the rail car typically includes a motor-generator set driven from a source of fuel 109. To monitor the refrigeration of the rail car 104 and the components of its refrigeration system, the rail car 104 is provided with the plurality of sensors 103. The plurality of sensors 103 may include sensors for temperature, pressure, fuel level, power source output, such as the voltage and current of the generator, and door position sensors or any combination thereof. One preferred system of the invention includes a first temperature sensor 111 which may be located at the output of a duct 106a for the air output of the evaporator 106, a second temperature sensor 112 located in the air entering the evaporator 106, a sensor for compressor operation 113, which can be a sensor to monitor the electric power drawn by the condenser fan motor or the electric power drawn by the compressor drive motor, or both, a fuel sensor 114 to monitor the level of fuel in the fuel source 109, a generator sensor 115 to monitor the output of the generator of the motor generator set 108, and a door sensor 116 to monitor the position of the doors 104a of the rail car 104. The system of the invention thus includes sensor means 103 generating data monitoring the operation of the refrigeration system of the vehicle, a data acquisition module 101 connected with the sensor means 103 and a communication interface 102 carried by the vehicle for receiving and transmitting information from the data acquisition module 101.

The data acquisition module includes data processing and storage means 101a and 101b connected with each of the sensor means 103 and with clock means 101c for providing time/temperature data. The data processing and storage means 101a and 101b of the data acquisition module provides means to store data indicating operation of the refrigeration system and to operate the communication interface 102 to transmit the operating status of the refrigeration system of the vehicle to a remote location. Sensor means 103 includes at least one temperature sensor, for example 111, and the data processing and storage means of the data acquisition module stores time/temperature data indicating the operation of the refrigeration system of the vehicle. Where the refrigeration system is operated by fuel and a fuel supply carried by the vehicle, as for example, in the refrigerated rail car 104, the sensor means 103 preferably also includes a fuel sensor 114 and the data acquisition and storage means 101 stores data on acceptable fuel levels and is programmed to operate the communication means 102 with a low fuel warning if the fuel level of the refrigeration system is less than acceptable. To avoid spurious signals resulting from variations in the output of the fuel level sensor 114 caused by movement of the rail car, the data acquisition and storage means stores fuel data over pre-selected time intervals, generates average fuel levels over the pre-selected time and operates the communication interface 102 to transmit fuel level data and provide a warning in the event the average fuel level reaches unacceptable levels.

This system is preferably provided with a plurality of temperature sensors, where one temperature sensor 111 is located in the supply air flowing from the evaporator 106, a second temperature sensor 112 is located in the return air to the evaporator from the rail car. The system is further provided with a generator output sensor 115, which preferably senses output voltage, and the data acquisition and storage module 101 is provided with data on acceptable generator outputs and is programmed to operate the communication interface with a low output alarm if the generator output is less than acceptable. Sensor means 103 can also include an evaporator fan power sensor (not shown) and the data acquisition and storage means 101 can store data on the interruption of the evaporator fan power and the duration of the interruption of the evaporator fan power and can operate the communication interface 102 to provide a warning signal if the evaporator fan power is interrupted for longer than an acceptable time, for example for longer than an acceptable defrost cycle.

With the system illustrated in FIGS. 13 and 14, the communications interface 102 is preferably a VHF transceiver and antenna carried by the vehicle as part of the Pegasus system. The data acquisition module 101 may be designed to receive its power from the power source for a transceiver 102. As set forth above, the data acquisition module 101 is programmed to operate the transceiver 102 and to transmit warning signals when the system of the invention senses that continued refrigeration of the rail car 104 is endangered. In addition, the data acquisition module 101 may be programmed to operate the communication transceiver 102 to transmit periodic status reports and to respond to messages received from a remote monitoring station and transmit stored information and data.

The system of the invention may thus be designed to monitor refrigerated rail cars, analyze their state and communicate alarms, reports and status messages as needed. The alarms and reports may be transmitted to a designated distant monitoring station through the Pegasus system. In addition to the Pegasus transceiver, the communication interface can include an infrared optical transmitter 120 located on the outside of the rail car to transmit information to a handheld control and display module 140, which can include an infrared receiver 142 and a printer 144 to provide a printed report on the operation of the refrigeration system including time/temperature data on the interior of the rail car.

Such systems can be designed to provide a variable temperature set point calibrated from $-40°$ to $-80°$ F., with a high temperature alarm trip point which is 5° higher than a setting that may be inputted to the data acquisition module through an input dial provided thereon. The data acquisition module may also be provided with a low temperature alarm function for dial settings of 32° or higher. For example, the low alarm can equal the temperature setting of the input dial at temperatures up to 36° and can be 5° lower than the dial setting for temperatures above 36°. To avoid the generation of an alarm signal during initialization of the system, the data acquisition module can programmed to permit the dial to be turned to one end of the dial for a short predetermined period, for example one second, and to the other end of the dial for a short predetermined, for example one second, to thereby disable the alarm functions. To provide an adequate margin of safety and an opportunity to replenish fuel in a refrigerated rail car, it is preferred that the low fuel alarm be transmitted if the fuel level goes below 40%. In monitoring the internal temperature of a rail car, the data acquisition module preferably will average the return air temperature into the evaporator over a period, such as an hour, and compare the average value with the alarm value entered into the system. The data acquisition monitor can also generate an alarm if the return air sensor fails or if the sensor wiring is damaged. As indicated above, in preferred systems the supply air temperature leaving the evaporator, the generator output voltage, the condenser fan power, the compressor power and the evaporator fan power are also monitored.

In preferred systems, data acquisition module 101 is provided with an alarm priority structure to avoid alarm cascades if a number of alarm conditions occur at the same time. In the alarm priority structure, the data acquisition module 101 is programmed so that only the highest priority alarm is transmitted by the communication interface 102. The remaining alarm conditions are stored in the data acquisition module until the primary alarm is corrected, and the lower priority alarms are not generated if the alarm conditions are removed by the correction of the highest priority alarm. For example, when generator sensor 115 indicates the generator voltage is lost, both the compressor and the evaporator will lose power and their sensors will indicate an alarm condition; however, when generator power is restored, the power to the compressor and evaporator will be restored and unless either the compressor or the evaporator are failed, their alarm conditions will be eliminated. If, however, either of these elements of the refrigeration system had failed, their alarm conditions will persist and will be transmitted. In preferred rail car systems, the fuel level and average return air are automatically transmitted by the system two minutes after the unit is turned on and every twelve hours thereafter.

Transmitted reports appear as "free form" messages of up to nine characters on the Pegasus message system. The messages include the date, the time the message was received, the rail car identification number and the rail car's location as tracked by the Pegasus message system. The format for reports from systems of the invention may vary, a list of possible messages with descriptions of their meaning follows:

[100P 20A]

This is the 12 hour report sent by a normally operating car. It is the percent fuel remaining and the return air temperature expressed in degrees above or below zero Fahrenheit.

[PRETRIP]

This is the message sent when the dial is set to 80 degrees after being set to −40 degrees for at least 1 second. This indicates that pretrip checkout is proceeding and no alarms are to be expected until the dial is set to a temperature lower than 70 degrees.

[LOW VOLT]

This alarm message indicates that generator power was lost.

[CFAN FAIL]

This alarm message indicates that the condenser fan lost power.

[SHORT CYC]

This alarm message indicates that the compressor cycled off and on three times in less than 15 minutes. This represents a failure in the refrigeration system.

[LONG DEFR]

This alarm message indicates that the unit stayed in defrost mode, i.e., evaporator fan off, for 30 minutes or more. This represents an abnormal condition in the refrigeration system.

[HIGH TEMP]

This alarm message indicates that the return air average temperature exceeded the alarm trip point value.

[LOW TEMP]

This alarm message indicates that the return air average temperature is below the alarm trip point value.

[LOW FUEL]

This alarm message indicates that the fuel remaining dropped below 40 percent.

[RSEN FAIL]

This alarm message indicates that the return air temperature sensor has failed or the sensor wiring has been damaged.

[EXCEPTION]

This alarm message indicates an unexpected computer restart due to problems with the diesel 12 v battery system or other electrical noise.

Figure 15:
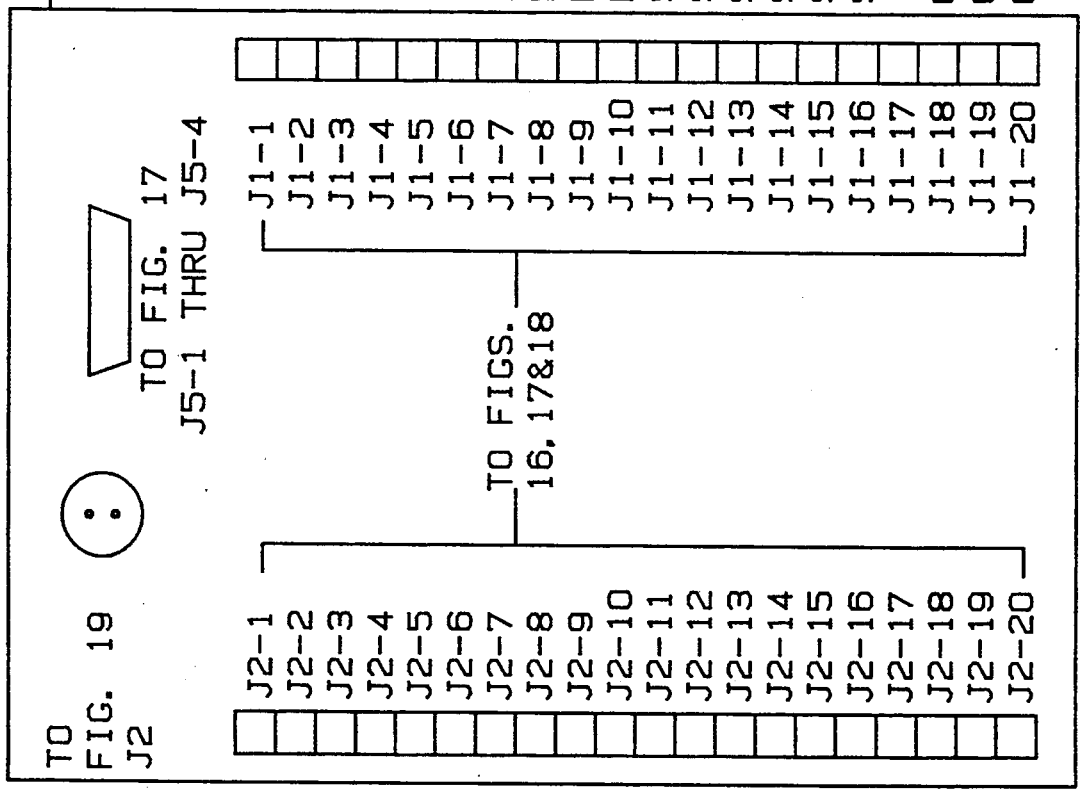
FIG. 15 illustrates the connection from sensors and refrigeration system components of a rail car to a system of the invention as shown in FIGS. 16 to 22.
Figure 16:
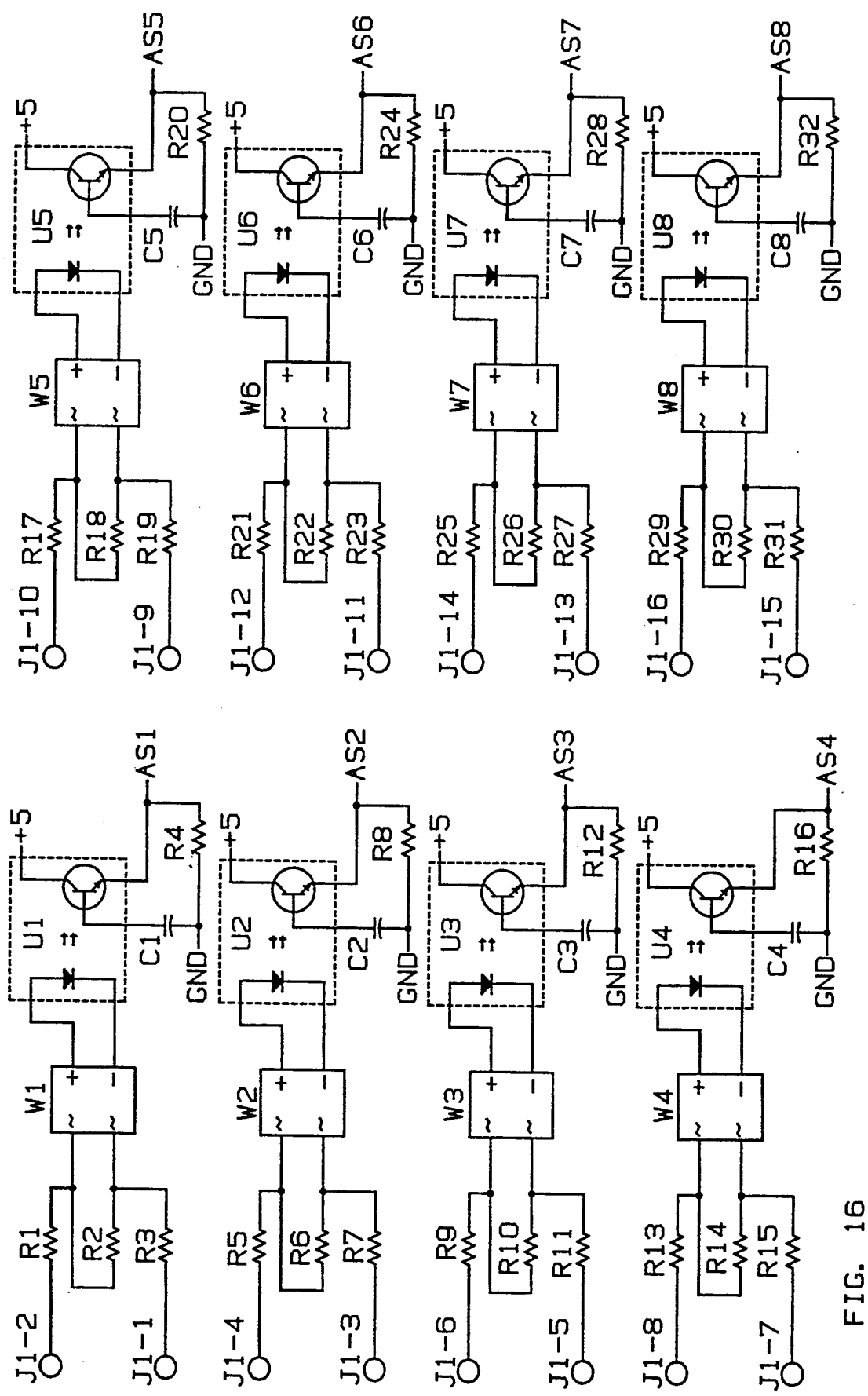
Figure 17:
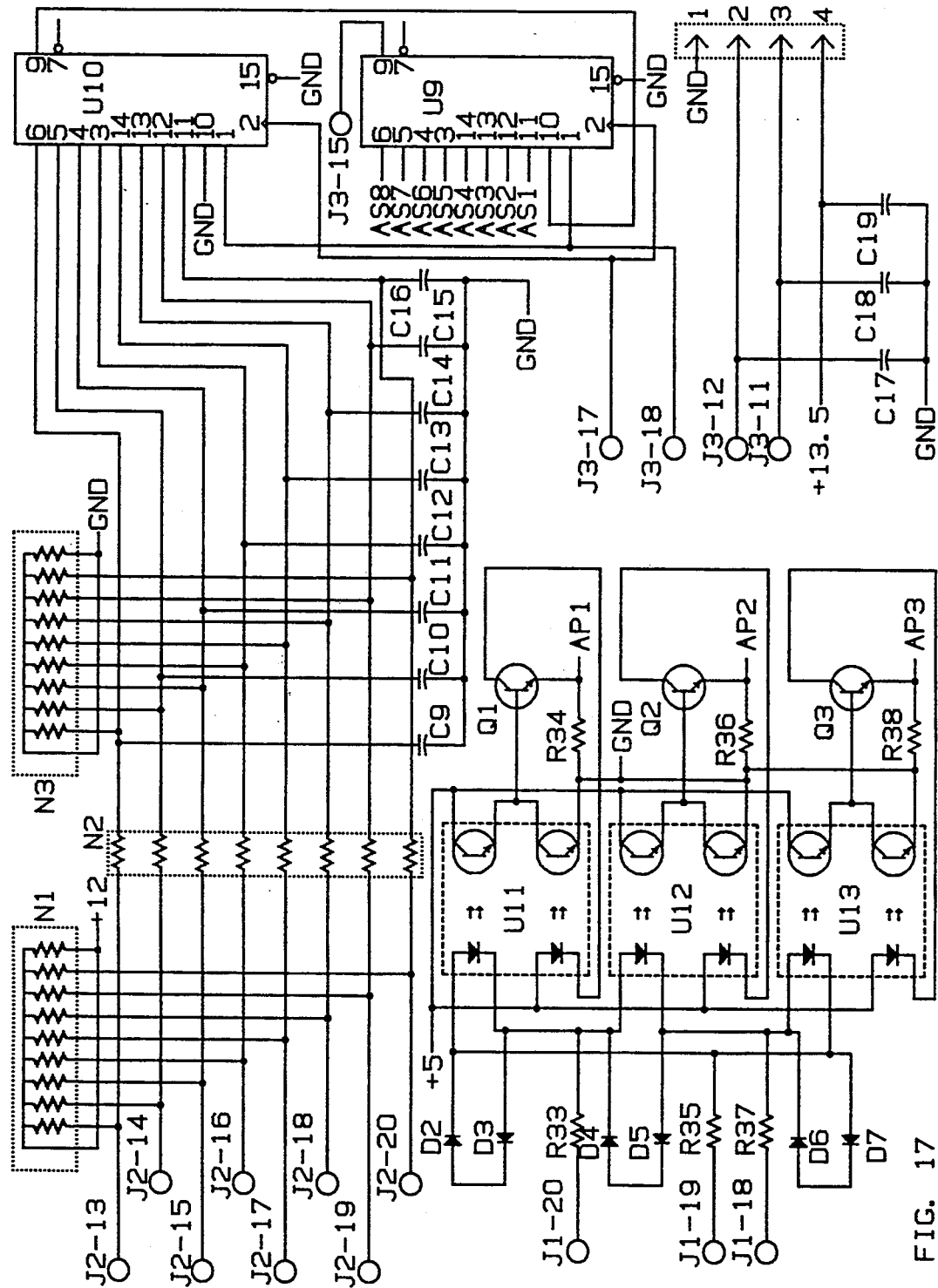
Figure 18:
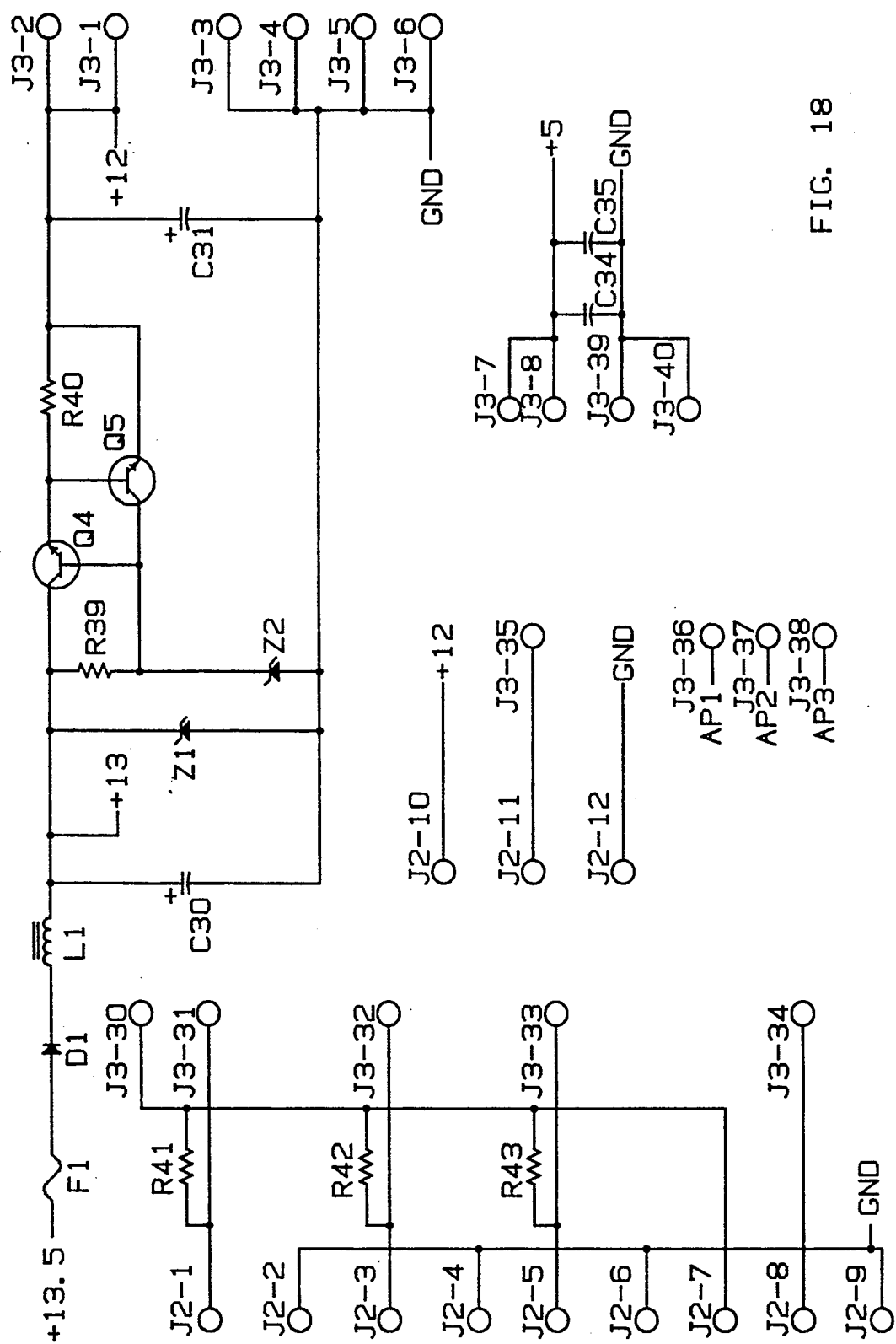
Figure 20:
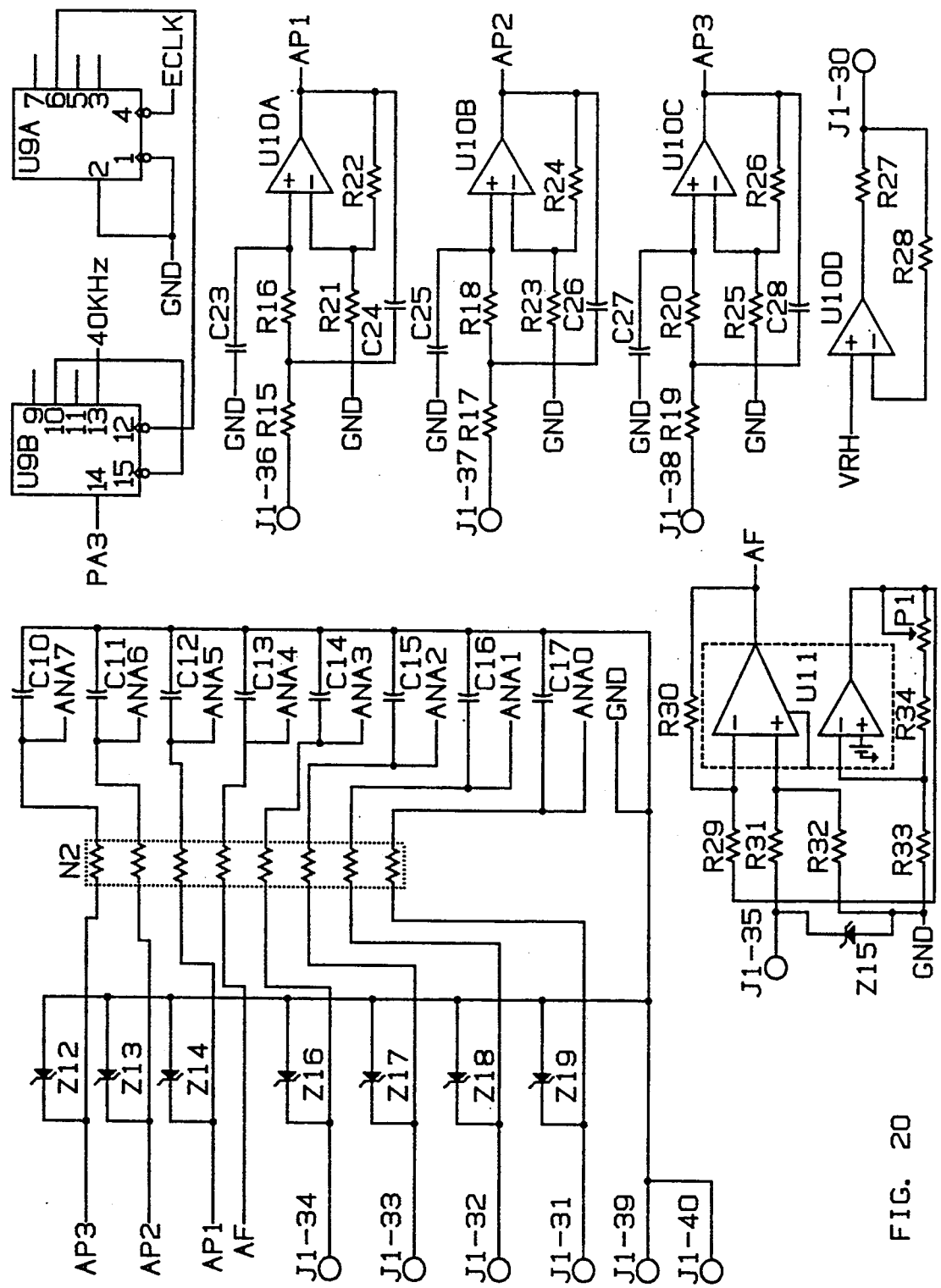
Figure 21:
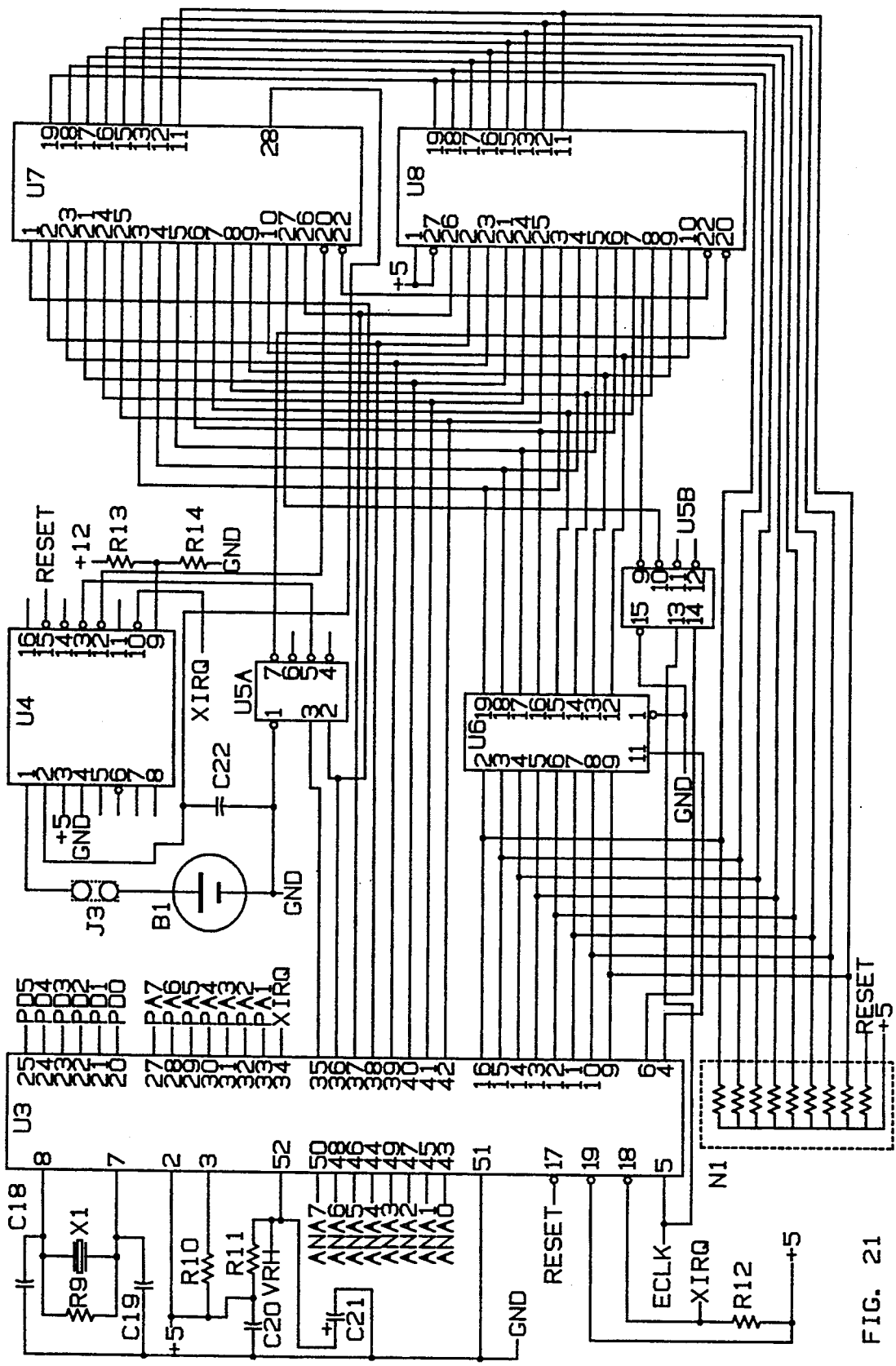

FIG. 15 is a typical installation wiring diagram for a system of the invention illustrating the connections between the data acquisition module 101, the communication interface 102 and a typical plurality of sensors 103. The identification of the connections on FIG. 15, J1-1 through J1-20 and J2-1 through J2-20, correspond to the same numbered connections on FIGS. 16–22. FIGS. 16, 17 and 18 are circuit diagrams of the electronic components provided on the input/output board of the data acquisition module 101. FIGS. 19, 20 and 21 are circuit diagrams of the electronic components included on the CPU board of the data acquisition module 101. The circuit portions shown on FIGS. 16–21 are interconnected at the corresponding terminals identified on each of the drawings and together comprise the circuit of the data acquisition module 101.

Figure 22:
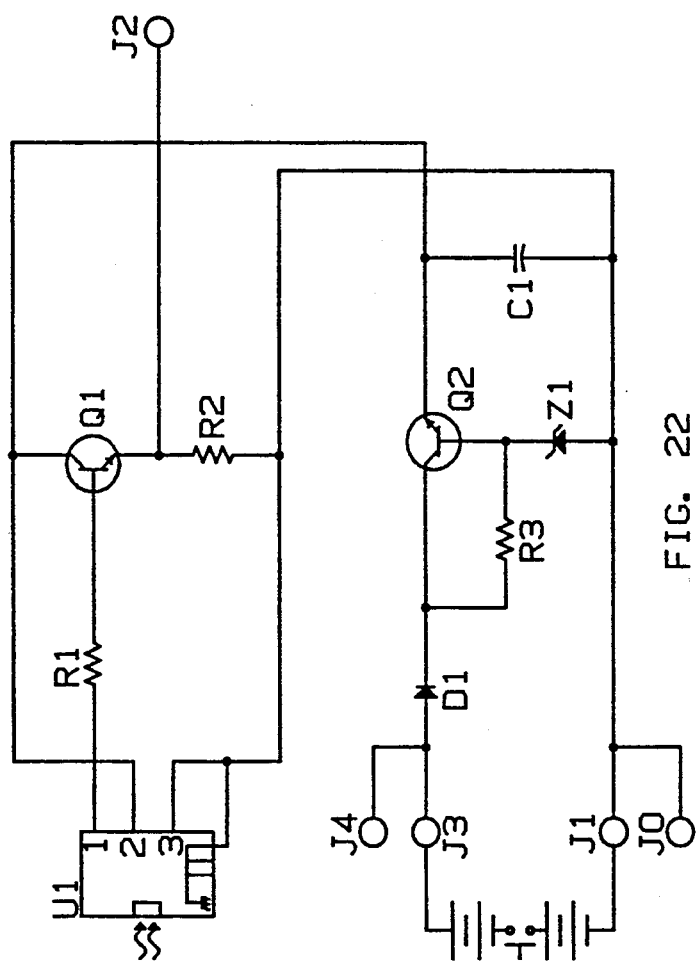

FIG. 22 is a circuit diagram of an infrared receiver 142 for use with a printer 144, such as the printer sold by Weightronix No. 3602-1200. The circuit elements of the circuit shown in FIGS. 3–12 are identified on the following lists.

| FIG. 3 | |
|---|---|
| C1 | 220 uF Capacitor |
| C2 | 10 uF Capacitor |
| C3 | 4.7 pF Capacitor |
| C4 | 100 pF Capacitor |
| D1 | MR510, Rectifier |
| D2 | 1N6379, Zener Diode |
| D5,8 | 1N5242B, Zener Diode |
| D4 | 1N5232B, Zener Diode |
| D3,6,7 | 1N914, Signal Diode |
| L1 | 500 uH Choke |
| Q1 | 2N4126, Transistor |
| Q2 | MPS-A28, Transistor |
| Q3 | 2N3019, Transistor |
| R1 | 160K OHM 1/4 Watt 5% Resistor |
| R2 | 430K OHM 1/4 Watt 5% Resistor |
| R3 | 20K OHM 1/4 Watt 5% Resistor |
| R4 | 8.1K OHM 1/4 Watt 5% Resistor |
| R5 | 10K OHM 1/4 Watt 5% Resistor |
| R6 | 620 OHM 1/2 Watt 5% Resistor |
| R7 | 1.0M OHM 1/4 Watt 5% Resistor |
| R8 | 2K OHM 1/4 Watt 5% Resistor |
| U1 | LM2940, Integrated Circuit |
| U2 | 74HCT14N, Integrated Circuit |
| FIG. 4 | |
| C10-21 | 0.1 uF Capacitor |
| D9-16 | 1N5231B, Zener Diode |
| N2 | 20K OHM Resistor Network |
| N3 | 100K OHM Resistor Network |

| | |
|---|---|
| N4,6 | 10K OHM Resistor Network |
| N5 | 22K OHM Resistor Network |
| Q4-7 | 2N3904, Transistor |
| R15-22 | 1650 OHM 1/8 Watt 1% Resistor |
| R23 | 330 OHM 1/4 Watt 5% Resistor |
| U2 | 74HCT14N, Integrated Circuit |
| FIG. 5 | |
| B1 | TO4/46, Lithium Battery |
| C5,6 | 22 pF Capacitor |
| C7,8 | 0.1 uF Capacitor |
| C9 | 10 uF Capacitor |
| N1 | 10K OHM Resistor Network |
| R9 | 10M OHM 1/4 Watt 5% Resistor |
| R10 | 4.7K OHM 1/4 Watt 5% Resistor |
| R11 | 10 OHM 1/4 Watt 5% Resistor |
| R12 | 10K OHM 1/4 Watt 5% Resistor |
| R13 | 619K OHM 1/8 Watt 1% Resistor |
| R14 | 100K OHM 1/8 Watt 1% Resistor |
| U3 | MC68HC11A1FN, Integrated Circuit |
| U4 | MAX693EPE, Integrated Circuit |
| U5 | 74HC139N, Integrated Circuit |
| U6 | 74HCT573N, Integrated Circuit |
| U7 | 6264LP-10, Integrated Circuit |
| U8 | 27C64-15JL, Integrated Circuit |
| X1 | 4.9152 MHz Crystal |
| FIG. 6 | |
| C1 | 220 uF Capacitor |
| C2 | 10 uF Capacitor |
| C3 | 4.7 pF Capacitor |
| C4 | 100 pF Capacitor |
| C11-14 | 0.1 uF Capacitor |
| D1 | MR510, Rectifier |
| D2 | 1N6379, Zener Diode |
| D3,6 | 1N914, Signal Diode |
| D4 | 1N5232B, Zener Diode |
| D5 | 1N5242B, Zener Diode |
| L1 | 500 uH Choke |
| P1 | DE-9PA, Connector |
| Q1 | 2N4126, Transistor |
| Q2 | MPS-A28, Transistor |
| R1 | 160K OHM 1/4 Watt 5% Resistor |
| R2 | 430K OHM 1/4 Watt 5% Resistor |
| R3 | 20K OHM 1/4 Watt 5% Resistor |
| R4 | 9.1K OHM 1/4 Watt 5% Resistor |
| R5 | 10K OHM 1/4 Watt 5% Resistor |
| U1 | LM2940, Integrated Circuit |
| U2 | 74HCT14N, Integrated Circuit |
| FIG. 7 | |
| C5 | 2.2 uF Capacitor |
| C6 | 0.22 uF Capacitor |
| C7 | 100 pF Capacitor |
| D7 | 1N914, Signal Diode |
| IC2 | 74HCT04N, Integrated Circuit |
| IC3 | 74HCT132N, Integrated Circuit |
| IC4 | 74HCT138N, Integrated Circuit |
| IC5 | 74HCT541N, Integrated Circuit |
| IC6 | 74C923N, Integrated Circuit |
| J1 | 9 PIN Connector |
| Q3 | 2N3904, Transistor |
| R6 | 2.2K OHM 1/4 Watt 5% Resistor |
| X2 | MCP-320 Beeper |
| FIG. 8 | |
| B1 | TO4/46, Lithium Battery |
| C8,9 | 22 pF Capacitor |
| C10,15 | 0.1 uF Capacitor |
| RN1 | 10K OHM Resistor Network |
| R7 | 10M OHM 1/4 Watt 5% Resistor |
| R8 | 4.7K OHM 1/4 Watt 5% Resistor |
| R9 | 10K OHM 1/4 Watt 5% Resistor |
| R10 | 619K OHM 1/8 Watt 1% Resistor |
| R11 | 100K OHM 1/8 Watt 1% Resistor |
| IC7 | MC68HC11A1FN, Integrated Circuit |
| IC10 | MAX693EPE, Integrated Circuit |
| IC3 | 74HC132N, Integrated Circuit |
| IC8 | 74HCT573N, Integrated Circuit |
| IC11 | KM62256LP-10, Integrated Circuit |
| IC12 | MBM27C128-25, Integrated Circuit |
| X1 | 4.9152 MHz Crystal |
| FIG. 9 | |
| A1-3 | PD2435, Integrated Circuit Display |
| C1-3 | 0.1 uF Capacitor |
| C4 | 22 uF Capacitor |
| FIG. 10 | |
| C1 | 100 uF Capacitor |
| D1 | 1N5242B, Zener Diode |
| D2,3 | 1N5231D, Zener Diode |
| J1 | DE-95 Connector |
| Q1 | TIP-101 Transistor |
| R1 | 2K OHM 1/4 Watt 5% Resistor |
| FIG. 11 | |
| C8 | 4.7 pF Capacitor |
| C5 | 100 pF Capacitor |
| C6 | 470 pF Capacitor |
| C7 | 1000 pF Capacitor |
| D12,13,15-17 | 1N914, Signal Diode |
| D11 | 1N5242B, Zener Diode |
| D14 | 1N5232B, Zener Diode |
| Q1,2 | 2N3906, Transistor |
| Q3 | 2N4126, Transistor |
| Q4 | MPS-A28, Transistor |
| Q5,6 | 160K OHM 1/4 Watt 5% Resistor |
| R2 | 430K OHM 1/4 Watt 5% Resistor |
| R3 | 20K OHM 1/4 Watt 5% Resistor |
| R4 | 9.1K OHM 1/4 Watt 5% Resistor |
| R5-7,11,15,17 | 10K OHM 1/4 Watt 5% Resistor |
| R8 | 1.8K OHM 1/4 Watt 5% Resistor |
| R9,10 | 1K OHM 1/4 Watt 5% Resistor |
| R12 | 5.1K OHM 1/4 Watt 5% Resistor |
| R13 | 20K OHM 1/4 Watt 5% Resistor |
| R14 | 30K OHM 1/4 Watt 5% Resistor |
| R16 | 3.9K OHM 1/4 Watt 5% Resistor |
| U1 | 74HC132N, Integrated Circuit |
| U2,3 | 6N139, Integrated Circuit |
| FIG. 12 | |
| C1 | 4700 uF Capacitor |
| C2,3 | 1000 uF Capacitor |
| C4 | 1 uF Capacitor |
| D1-8 | 1N4004, Rectifier |
| D9,10 | 1N914, Signal Diode |
| D18,19 | 1N5242B, Zener Diode |
| Q7 | 2N3904, Transistor |
| Q8 | 1N3906, Transistor |
| R18,19 | 4.7K OHM 1/4 Watt 5% Resistor |
| U4 | LM340T-5.0, Integrated Circuit |

The circuit elements of the circuit shown in FIGS. 16–21 are identified on the following lists.

| | |
|---|---|
| FIG. 16 | |
| C1-8 | 1000 pF Capacitor |
| R1,3,5,7,9,11 13,15,17,19, 21,23,25,27, 29,31 | 120K OHM Resistor |
| R2,6,10,14, 18,22,26,30 | 24K OHM Resistor |
| R4,8,12,16,20, 24,28,32 | 51K OHM Resistor |
| U1-8 | MOC8100, Optoisolator |
| U9 | 74HCT165, Integrated Circuit |
| W1-8 | DB1F, Bridge Rectifier |
| FIG. 17 | |
| C9-16 | 0.1 uF Capacitor |
| C17-19 | 0.01 uF Capacitor |
| D2-7 | 1N914, Signal Diode |
| N1 | 10K OHM × 9 Resistor Network |
| N2 | 100K OHM × 8 Resistor Network |
| N3 | 22K OHM × 9 Resistor Network |
| Q1-3 | 2N3904, Transistor |
| R33,35,37 | 121K OHM 1% Resistor |
| R34,36,38 | 2.49K OHM 1% Resistor |
| U10 | 74HCT165, Integrated Circuit |
| U11-13 | MCT-6, Optoisolator |
| FIG. 18 | |
| C30 | 220 uF Capacitor |
| C31 | 33 uF Capacitor |
| C34,35 | 0.1 uF Capacitor |
| D1 | MR510, Rectifier |
| F1 | 1/2 AMP Fuse |

| | -continued |
|---|---|
| L1 | 500 uH Choke |
| Q4 | TIP102, Transistor |
| Q5 | 2N4401, Transistor |
| R39 | 1K OHM Resistor |
| R40 | 2.4 OHM Resistor |
| R41–43 | 16.5K OHM 1% Resistor |
| Z1 | 1N6379, Zener Diode |
| Z2 | 1N5243B, Zener Diode |
| FIG. 19 | |
| C1 | 22 uF Capacitor |
| C2,3 | 10 uF Capacitor |
| C4–7 | 0.1 uF Capacitor |
| C8 | 2.2 uF Capacitor |
| D1 | 1N914, Signal Diode |
| Q1 | 2N3906, Transistor |
| Q2 | 2N3904, Transistor |
| Q3 | 2N4401, Transistor |
| R1,5–7 | 10K OHM Resistor |
| R2,4 | 2.2K OHM Resistor |
| R8 | 160 OHM Resistor |
| R35 | 4.7K OHM Resistor |
| U1 | LM2940, Integrated Circuit |
| U2 | 7660, Integrated Circuit |
| FIG. 20 | |
| C10–17 | 0.1 uF Capacitor |
| C23–28 | 0.47 uF Capacitor |
| N2 | 2K OHM × 8 Resistor Network |
| P1 | 20K OHM Potentiometer |
| R15–20 | 100K OHM Resistor |
| R21–26 | 100K OHM 1% Resistor |
| R27 | 1K OHM Resistor |
| R28 | 10K OHM Resistor |
| R29,31,33 | 10K OHM 1% Resistor |
| R30,32 | 40.2K OHM 1% Resistor |
| R34 | 30.1K OHM 1% Resistor |
| U9 | 74HC390, Integrated Circuit |
| U10 | LT1014, Integrated Circuit |
| U11 | LM10, Integrated Circuit |
| Z12–19 | 1N5234B, Zener Diode |
| FIG. 21 | |
| B1 | TO4/46, Lithium Battery |
| C18,19 | 22 pF Capacitor |
| C20,22 | 0.1 uF Capacitor |
| C21 | 10 uF Capacitor |
| N1 | 10K OHM × 9 Resistor Network |
| R9 | 10M OHM Resistor |
| R10 | 4.7K OHM Resistor |
| R11 | 10 OHM Resistor |
| R12 | 10K OHM Resistor |
| R13 | 61.9K OHM 1% Resistor |
| R14 | 100K OHM 1% Resistor |
| U3 | MC68HC11, Integrated Circuit |
| U4 | MAX693, Integrated Circuit |
| U5 | 74HC139, Integrated Circuit |
| U6 | 74HCT573, Integrated Circuit |
| U7 | 62256, Integrated Circuit |
| U8 | 27C128, Integrated Circuit |
| X1 | 4.9152 MHz Crystal |

The circuit elements of the circuit shown in FIGS. 3–12 are interconnected as follows. In the data acquisition unit 11, the connections J1-1 (+13 v.) and J1-2 (GND) of FIG. 3 are connected to the electrical system and cabling of the tractor-trailer. The connection J1-3 of FIG. 3 connects the tractor-trailer cabling to the circuit of FIG. 3 interfacing the data input/output connections PD0 and PD1 that are connected to the corresponding microprocessor connections of FIG. 5 thereby providing a vehicle line (VLINK, 11a). The J2 connection at the left of FIG. 4 interconnects the temperature sensors (15, 16) of the system to the circuits of FIG. 4 interfacing connections ANA0–ANA7 that are connected to the corresponding microprocessor connections of FIG. 5. The connections J1-7–J1-10 at the right of FIG. 4 interconnect the compressor sensor or switch door sensor on switch and other auxiliary inputs to the circuits of FIG. 4 interfacing connections PD2–PD5 that are connected to the corresponding microprocessor connections of FIG. 5. The connections PA3–PA6 at the right of FIG. 4 are connected with the corresponding microprocessor connections of FIG. 5 with the red/green alarm lights through connector J4 and with a pager output at J1-5 and an auxiliary alarm output at J1-4.

In the control and display unit 13, the connections P1–P9 at the left of FIG. 6 connect to the connections S1–S9 (+13VIN; VLINK; GND; +13VOUT; DOOR; GND; NODE3; SD and CTS, respectively) at the left of FIG. 10, and are there interconnected to the tractor-trailer cabling system by connectors P1–P4 at the left of FIG. 10. The connections PD0 and PD1 at the right of FIG. 6 connect the corresponding terminals of the microprocessor in FIG. 8 to connector P-2 at the left of FIG. 6 through the interfacing circuits of FIG. 6. The connections PA1, PA2, PD4 and PD5 at the right of FIG. 6 are connected with corresponding terminals of the microprocessor in FIG. 8. The connections at J1 in the lower left of FIG. 7 are for the keyboard. The connections /OE, E, R/W and WR at the upper left of FIG. 7 are connected to the corresponding connections at FIG. 8. The connections J2, 1–20, at J2 at the right of FIG. 7 (+5 v;/READ; D0;/ENABLEL; D1; No connection;/D2;/ENABLEM; D3; RESET; D4;/ENABLER; D5; A2; D6; A1; D7; A0;/WRITE; and GROUND, respectively) are connected to the corresponding connections at J1 of FIG. 9. The connections D0–D7 at the bottom of FIG. 7 are connected to the corresponding connections at the bottom of FIG. 8. The connections A2, A3 and A12–15 and PA6 are connected to the corresponding connections of FIG. 8. The connections J1–J4 of FIG. 10 interface with the printer. The connections at the left of FIG. 11 (J1-1, VLINK; J1-2, GND) are provided for connection to the tractor-trailer cabling system and through the interfacing circuits of FIG. 11 with connections J1-3, J1-4 for an upstream data processing system. The connections of FIG. 12 are connected to the corresponding connections of FIG. 11.

All ground connections of FIGS. 3–11 are vehicle ground cable or chassis grounds.

In FIG. 15, the connectors J1-1 through J1-16 are connected to the corresponding connections of FIG. 16 are through the interfacing circuits of FIG. 16 to the corresponding connections AS1–AS8 of FIG. 16 which are connected to the corresponding connections of FIG. 17. The connections J2-13 through J2-20 at the left of FIG. 17 are connected to the corresponding connections J2-13 through J2-20 of FIG. 15. The connections J1-18 through J1-20 at the left of FIG. 17 are connected with the corresponding connections J1-18 through J1-20 of FIG. 15. The connections J3-11, J3-12, J3-17 and J3-18 of FIG. 17 are connected through J5, 1–4 at the right of FIG. 17 to connections J1-11, J1-12 at the right of FIG. 19, J1-17, J1-18 and J1-19 at the left of FIG. 19. The connections AP1, AP2 and AP3 at the center of FIG. 17 are connected to the corresponding connections at the center of FIG. 18. The connections J2-1 through J2-12 are connected to the corresponding terminals of FIG. 15. The connections J3-1 through J3-8 of FIG. 18 are connected to connections J1-1 through J1-8 of FIG. 19, and connections J3-30 through J3-40 of FIG. 18 are connected to connections J1-30 through J1-40 of FIG. 20. The connections J2-1 through J2-12 of FIG. 18 are connected to the corresponding connections of FIG. 15. The connections PD0 through PD5 are connected to the microprocessor of FIG. 21. The connections J1-21 through J1-27 of FIG. 19 are connected through connections PA1, PA2 and PA4-PA7 of FIG. 19 with the corresponding microprocessor connections of FIG. 21. The connections J2 of FIG. 19 correspond with J2 of FIG. 15. The connections AP-1-AP-3 at the left side of FIG. 20 and the connections AP1-AP3 at the right side of FIG. 20 are connected together. The connections AF of FIG. 20 are connected together. The connection DA3 of FIG. 20 is connected to the corresponding microprocessor connection of FIG. 21. The connection ECLK at the upper right of FIG. 20 is connected to the connection ECLK at the lower left of FIG. 21. In FIG. 21, the connections RESET and XIRQ are interconnected, and the J3 connections are connected together.

While the preceding description describes a best mode of carrying out the invention and a preferred embodiment, the invention is not limited by the preceding description but only by the scope of the invention, the prior art and the following claims.

What is claimed is:

1. A system for monitoring a refrigeration system for a vehicle, comprising:
    sensor means for generating data responsive to one or more parameters of operation of the refrigeration system of the vehicle;
    data processing and storage means in communication with said sensor means; and
    a communication interface carried by said vehicle for receiving and transmitting information,
    wherein said data processing and storage means includes means to store said generated data and to operate said communication interface to transmit a signal representing the operating status of said refrigeration system to a remote location;
    said refrigeration system is operated by fuel from a vehicle-carried fuel supply; said sensor means comprises a fuel sensor; and said data processing and storage means stores data on acceptable fuel levels and operates the communication interface to provide a low fuel warning if the fuel level of the refrigeration system is less than the acceptable.

2. The system of claim 1 wherein said data processing and storage means stores fuel data over a preselected time, generates an average fuel level value from said stored fuel data and operates the communication interface to transmit a signal related to said average fuel level data.

3. The system of claim 1 wherein said data processing and storage means operates said communication interface to transmit the operating status of said refrigeration system on a predetermined time schedule.

4. The system of claim 1 wherein said communication interface comprises an infrared optical transmitter located on the vehicle and operated by said data processing and storage means to transmit time/temperature data.

5. A system for monitoring a refrigeration system for a vehicle, comprising:
    sensor means for generating data responsive to one or more parameters of operation of the refrigeration system of the vehicle;
    data processing and storage means in communication with said sensor means; and
    a communication interface carried by said vehicle for receiving and transmitting information,
    wherein said data processing and storage means includes means to store said generated data and to operate said communication interface to transmit a signal representing the operating status of said refrigeration system to a remote location;
    said refrigeration system is operated by an electrical generator; said sensor means comprises a generator output sensor; and said data processing and storage means stores data related to generator outputs and operates the communication interface to provide a low output alarm signal if the sensed generator output is less than an acceptable value derived from said stored generator output data.

6. A system for monitoring a refrigeration system for a vehicle, comprising:
    sensor means for generating data responsive to one or more parameters of operation of the refrigeration system of the vehicle;
    data processing and storage means in communication with said sensor .Beans; and
    a communication interface carried by said vehicle for receiving and transmitting information,
    said data processing and storage means including means to store said generated data and to operate said communication interface to transmit a signal representing the operating status of said refrigeration system to a remote location,
    wherein said sensor means comprises an evaporator fan power sensor, said data processing and storage means stores data relating to the interruption of evaporator fan power and the time of interruption of evaporator fan power and operates the communication interface if sensed evaporator fan power is interrupted longer than an acceptable time derived from said stored time of interruption data.

7. A system for monitoring a refrigeration system for a vehicle, comprising:
    sensor means for generating data responsive to one or more parameters of operation of the refrigeration system of the vehicle;
    data processing and storage means in communication with said sensor means; and
    a communication interface carried by said vehicle for receiving and transmitting information,
    wherein said data processing and storage means includes means to store said generated data and to operate said communication interface to transmit a signal representing the operating status of said refrigeration system to a remote location;
    said vehicle comprises a refrigerated rail car; said refrigeration system is operated by fuel from a fuel supply carried by said rail car; said sensor means comprises at least one temperature sensor and a fuel level sensor; said data processing and storage means stores temperature data and fuel level data and operates said communication interface to transmit temperature and fuel level data; and said communication interface comprises a VHF transmitter and a VHF antenna adapted to radiate said temperature and fuel level data to a distant receiving station.

8. A system for monitoring operation of a refrigerated vehicle comprising:
    sensor means for sensing and generating a signal indicating at least one temperature within said refrigerated vehicle;

data processing and storage means in communication with said sensor means for generating and storing time/temperature data in response to said signal;

output means in communication with said data processing and storage means for outputting time/temperature data to provide a temperature history record of the refrigerated vehicle, said output means comprising a separate handheld unit adapted to be connected directly to the data processing and storage means, said handheld unit comprising means for receiving data from said data processing and storage means.

9. The system of claim 8 wherein said separate handheld unit comprises an information display, a multiple button key pad and a vehicular-mounting interface, said handheld unit providing means for a user to program said data processing and storage means.

10. The system of claim 8 wherein said handheld unit is combined with a printing means to provide a printed temperature history of the refrigerated vehicle.

11. The system of claim 8 wherein said separate handheld unit includes means adapted to display compartment temperatures, to provide a warning signal if the difference between an actual compartment temperature and a predetermined acceptable temperature is greater than a predetermined margin, and to print a set of time/temperature data comprising the temperatures sensed by said sensor means and corresponding times at which each said temperature is sensed.

12. The system of claim 8 wherein said handheld unit further comprises means for accessing and storing time/temperature data stored by said data processing and storage means and means for transmitting programs and data to said data processing and storage means.

13. The system of claim 12 wherein said handheld unit is portable and adapted to be connected to second data processing means remote from said refrigerated vehicle to permit data stored in the handheld unit to be transported and inputted to a second data processing means.

14. The system of claim 8 wherein the handheld unit further comprises an alphanumeric display and means for generating prompting instructions to an operator via the alphanumeric display.

15. A system for monitoring operation of a refrigerated vehicle comprising:
sensor means for generating a signal indicating at least one temperature within said refrigerated vehicle;
data processing and storage means in communication with said sensor means for receiving said signal and generating and storing time/temperature data in response to said signal; and
a communication interface in communication with said data processing and storage means for outputting time/temperature data, said communication interface comprising an infrared optical transmitter located on the vehicle and operated by said data processing and storage means for transmitting time/temperature data from the refrigerated vehicle.

16. The system of claim 15 wherein said data processing and storage means is responsive to a signal received by said communication interface to transmit an operating status of said refrigerated vehicle in response thereto.

17. A system for monitoring operation of a refrigerated vehicle comprising:
sensor means for sensing and generating a signal indicating at least one temperature within said refrigerated vehicle;
data processing and storage means in communication with said sensor means for receiving said signal from said sensor means and generating and storing time/temperature data in response to said signal;
output means in communication with said data processing and storage means for outputting time/temperature data to provide a temperature history record of the refrigerated vehicle, and
a handheld temperature probe, said probe being adapted for connection to said data processing and storage means whereby, upon contact of said temperature probe with articles to be carried within said refrigerated vehicle, said temperature probe senses the temperature of the articles and provides data comprising article temperatures to said data processing and storage means.

18. The system of claim 17 wherein said handheld temperature probe further comprises means to store said article temperatures and the time said article temperatures were sensed.

19. The system of claim 17 wherein said handheld temperature probe is provided with a visual display means whereby the article temperature measured by the probe may be displayed.

20. The system of claim 17 wherein said handheld temperature probe includes a sensor for sensing article temperature while detached from the data processing and storage means, and further comprises means for storing article temperature data and the times of said measurements and means for outputting such time/temperature data.

21. The system of claim 17 further comprising a self-contained, battery powered unit including:
an illuminated temperature display; and
interfacing means to connect said temperature measuring probe to said data processing and storage means.

22. A system for a rail car carrying a refrigeration system including refrigeration components and a fuel-driven power source for said refrigeration system components, comprising:
temperature and fuel sensor means for generating data responsive to one or more parameters of operation of the refrigeration system;
data processing and storage means in communication with said sensor means for processing said generated data to develop messages containing temperature and fuel data; and
a radio communication interface carried by said vehicle and operated by said data processing and storage means to transmit said messages by radio to a distant location.

23. The system of claim 22 wherein said data processing and storage means stores fuel data generates an average fuel level value from said stored fuel data and operates the radio communication interface to transmit a low fuel message if the average fuel level falls below a predetermined level.

24. The system of claim 22 wherein the refrigeration system components are operated by an electrical generator, said system further comprising a generator output sensor, and said data processing and storage means stores data on acceptable generator outputs and operates the radio communication interface to transmit a low output alarm message if the sensed generator output falls below a predetermined value.

25. The system of claim 22 wherein said system further comprises an evaporator fan power sensor, said data processing and storage means stores data relating to the interruption of evaporator fan power and the time of interruption of evaporator fan power and operates the radio communication interface to transmit a long defrost message if sensed evaporator fan power is interrupted longer than an acceptable time derived from said stored time of interruption data.

26. The system of claim 22 wherein said data processing and storage means operates said radio communication interface to transmit a signal representing the operating status of said refrigeration system on a programmed, stored time schedule.

27. The system of claim 22 wherein said data processing and storage means is responsive to a radio signal received by said radio communication interface.

* * * * *